US012674900B2

(12) United States Patent
Cao et al.

(10) Patent No.: US 12,674,900 B2
(45) Date of Patent: Jul. 7, 2026

(54) DEVICES AND METHODS FOR MEASURING TRITIUM PRODUCTION

(71) Applicant: Ohio State Innovation Foundation, Columbus, OH (US)

(72) Inventors: Lei Raymond Cao, Columbus, OH (US); Andrew Maier, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 175 days.

(21) Appl. No.: 18/756,107

(22) Filed: Jun. 27, 2024

(65) Prior Publication Data

US 2025/0004150 A1 Jan. 2, 2025

Related U.S. Application Data

(60) Provisional application No. 63/523,958, filed on Jun. 29, 2023.

(51) Int. Cl.
G01T 3/06 (2006.01)

(52) U.S. Cl.
CPC ...................................... G01T 3/06 (2013.01)

(58) Field of Classification Search
CPC ........................................................ G01T 3/06
See application file for complete search history.

(56) References Cited

U.S. PATENT DOCUMENTS

| | | | | | |
|---|---|---|---|---|---|
| 3,940,617 | A | * | 2/1976 | Farnum ................... | G01N 23/22 376/151 |
| 5,080,693 | A | * | 1/1992 | Bourne ..................... | C01B 4/00 376/256 |
| 2005/0135532 | A1 | * | 6/2005 | Taleyarkhan ............ | G21B 3/00 376/100 |
| 2023/0420597 | A1 | | 12/2023 | Cao et al. | |

FOREIGN PATENT DOCUMENTS

| | | | | | |
|---|---|---|---|---|---|
| CA | 1155565 | A | * | 10/1983 | ............... G21G 1/02 |
| WO | WO-2005001845 | A2 | * | 1/2005 | ............... G21B 1/23 |
| WO | 2024/035846 | A1 | | 2/2024 | |
| WO | 2024/206309 | A2 | | 10/2024 | |

* cited by examiner

*Primary Examiner* — Mark R Gaworecki
(74) *Attorney, Agent, or Firm* — Meunier Carlin & Curfman LLC

(57) ABSTRACT

Disclosed herein are devices and methods for measuring tritium production. For example, disclosed herein are devices comprising a first layer and a second layer, each comprising a detection material, and the thickness the layers being configured such that tritium cannot pass therethrough. When a lithium composition is substantially contained within a chamber formed by the first and second layers, and a neutron irradiation source irradiates the lithium composition disposed within the chamber; then the device produces tritium within the chamber that diffuses to the first layer and/or the second layer, and the tritium interacts with the first detection material and/or the second detection material to thereby form a signal that is detected and analyzed to (Continued)

determine a property of tritium, such as the presence or absence of tritium production, the amount or concentration of tritium produced, the rate of tritium production, or a combination thereof.

20 Claims, 7 Drawing Sheets

104

101

103/106

<u>104</u>

<u>102</u>

<u>103/106</u>

104

101

107

103/106

DEVICES AND METHODS FOR MEASURING TRITIUM PRODUCTION

CROSS-REFERENCE TO RELATED APPLICATIONS

This application claims the benefit of priority to U.S. Provisional Application No. 63/523,958 filed Jun. 29, 2023, which is hereby incorporated herein by reference in its entirety.

BACKGROUND

Tritium is an isotope of hydrogen with two neutrons and one proton forming the nucleus. It has a half-life of 12.3 years. Tritium gas finds usage in a wide range of industrial applications. Tritium is used in neutron generator based on (D, T), i.e., (deuterium, tritium) reaction, which is also the fuel of nuclear fusion based on the same reaction.

Tritium gas can be produced through a variety of methods. However, it is difficult to measure tritium production. The devices and methods discussed herein address this and other needs.

SUMMARY

In accordance with the purposes of the disclosed devices and methods as embodied and broadly described herein, the disclosed subject matter relates to devices and methods for measuring tritium production.

For example, disclosed herein are devices for measuring tritium production. The devices comprise a first layer comprising a first detection material; and a second layer comprising a second detection material; wherein the first detection material and the second detection material are the same or different. The first layer has a first thickness and the second layer has a second thickness, wherein the first thickness and the second thickness are the same or different; wherein the first thickness and the second thickness are configured such that tritium cannot pass through the first layer or the second layer. When the device is assembled together with: a composition comprising lithium (e.g., a lithium composition); and a neutron irradiation source; such that the lithium composition is in contact with and sandwiched between the first layer and the second layer, the first layer and the second layer each having a perimeter which together form a periphery of the device, and the first layer is sealed to the second layer to form a seal (e.g., around the periphery) such that the lithium composition is substantially contained within a chamber formed by the first layer, the second layer, and the seal; and such that the neutron irradiation source is configured to irradiate the lithium composition disposed within the chamber formed by the first layer, the second layer, and the seal; then the device produces tritium within the chamber that diffuses to the first layer and/or the second layer, and the tritium interacts with the first detection material and/or the second detection material to thereby form a signal that is detected and analyzed to determine a property of tritium, such as the presence or absence of tritium production, the amount or concentration of tritium produced, the rate of tritium production, or a combination thereof.

In some examples, the device further comprises the lithium composition.

In some examples, the lithium composition comprises a third layer sandwiched between the first layer and the second layer, the third layer having a third thickness configured to allow tritium to escape the lithium composition and enter the first layer and/or second layer. In some examples, the third thickness is from 1 to 100 micrometers, such as from 1 to 25 micrometers, or from 5 to 10 micrometers.

In some examples, the lithium composition comprises lithium metal.

In some examples, the lithium composition comprises a lithium compound, such as $Li_2CO_3$ and/or FLiBe.

In some examples, the lithium composition comprises a powder, a rod, a film, a molten salt, or a combination thereof.

In some examples, the lithium composition comprises natural lithium or enriched lithium (e.g., enriched with Li-6).

In some examples, the lithium composition is enriched with Li-6. In some examples, the lithium composition is 90% to 100% enriched with Li-6 (e.g., 95% enriched).

In some examples, the chamber has any suitable shape and/or dimensions.

In some examples, the first thickness is selected in view of the first detection material and the second thickness is selected in view of the second detection material, such that the device has sufficient rigidity and to selectively capture tritium within the first layer and/or the second layer.

In some examples, the first detection material and/or the second detection material independently comprises a polymer, such as CR-39, cellulose, or a combination thereof.

In some examples, the first detection material and the second detection material are the same. In some examples, the first detection material and the second detection material both comprise CR-39.

In some examples, the first thickness and/or the second thickness are each independently from 0.1 to 10 millimeters, such as from 1 to 5 millimeters or from 0.25 to 1.5 millimeters.

In some examples, the first layer and/or the second layer independently has a lateral surface area of from 0.1 to 100 $cm^2$, such as from 0.1 to 10 $cm^2$ or from 0.5 to 5 $cm^2$.

In some examples, the first layer and the second layer are the same.

In some examples, the device further comprises: a fourth layer comprising a first alpha particle blocking material; and a fifth layer comprising a second alpha particle blocking material; wherein the first alpha particle blocking material and the second alpha particle blocking material are the same or different. The fourth layer has a fourth thickness and the fifth layer has a fifth thickness, wherein the fourth thickness and the fifth thickness are the same or different; wherein the fourth thickness and the fifth thickness are configured such that alpha particles cannot pass through the fourth layer or the fifth layer, but tritium can pass through both the fourth layer and the fifth layer. When the device is assembled together with: the lithium composition; and the neutron irradiation source; such that: the lithium composition is in contact with and sandwiched between the fourth layer and the fifth layer; the fourth layer is in contact with and sandwiched between the first layer and the lithium composition; the fifth layer is in contact with and sandwiched between the second layer and the lithium composition; and the lithium composition, the fourth layer, and the fifth layer are contained within the chamber formed by the first layer, the second layer, and the seal; and then the device produces tritium within the chamber that diffuses through the fourth layer and/or the fifth layer to the first layer and/or the second layer, and when the device produces alpha particles within the chamber, then the alpha particles diffuse to and are captured by the fourth layer and/or the fifth layer.

In some examples, the fourth thickness is selected in view of the first alpha particle blocking material and the fifth thickness is selected in view of the second alpha particle blocking material, such that the device selectively captures alpha particles within the fourth layer and/or the fifth layer.

In some examples, the first alpha particle blocking material and/or the second alpha particle blocking material comprises a polymer, such as Kapton, Mylar, or a combination thereof.

In some examples, the first alpha particle blocking material and the second alpha particle blocking material are the same. In some examples, the first alpha particle blocking material and the second alpha particle blocking material both comprise Kapton.

In some examples, the fourth layer and the fifth layer are the same.

In some examples, the device further comprises the neutron irradiation source configured to irradiate the lithium composition. In some examples, the neutron irradiation source comprises a nuclear reactor, a thermal neutron beam, a thermal neutron source such as a thermalized Am—Be source, or a combination thereof.

In some examples, the neutron irradiation source has a neutron flux, such as from $1 \times 10^6$ to $5 \times 10^{13}$ $cm^{-2}s^{-1}$, or from $5 \times 10^6$ to $1.2 \times 10^{13}$ $cm^{-2}s^{-1}$.

Also disclosed herein are methods for measuring tritium production. In some examples, the methods comprise: disposing a composition comprising lithium (e.g., a lithium composition) between a first layer comprising a first detection material and a second layer comprising a second detection material, the first layer and the second layer each having a perimeter which together form a periphery. The methods further comprise sealing (e.g., hermetically sealing) the first layer to the second layer (e.g., around the periphery) such that the lithium composition is substantially contained within a chamber formed by the first layer, the second layer, and the seal (e.g., hermetic seal) between the first layer and the second layer. The first detection material and the second detection material are the same or different. The first layer has a first thickness and the second layer has a second thickness, wherein the first thickness and the second thickness are the same or different. The first thickness and the second thickness are configured such that tritium cannot pass through the first layer or the second layer. The methods further comprise irradiating the lithium composition within the chamber with a neutron irradiation source; thereby producing tritium gas within the chamber that diffuses to the first layer and/or the second layer, and the tritium interacts with the first detection material and/or the second detection material to thereby form a signal. The methods further comprise detecting and analyzing the signal to determine a property of tritium, such as the presence or absence of tritium production, the amount or concentration of tritium produced, the rate of tritium production, or a combination thereof.

Also disclosed herein are method for measuring tritium production, the methods comprising disposing a composition comprising lithium (e.g., a lithium composition) between a fourth layer comprising a first alpha particle blocking material and a fifth layer comprising a second alpha particle blocking material, thereby forming a first stack; and disposing the first stack between a first layer comprising a first detection material and a second layer comprising a second detection material; such that the lithium composition is in contact with and sandwiched between the fourth layer and the fifth layer, the fourth layer is in contact with and sandwiched between the first layer and the lithium composition, and the fifth layer is in contact with and sandwiched between the second layer and the lithium composition; the first layer and the second layer each having a perimeter which together form a periphery. The methods further comprise sealing (e.g., hermetically sealing) the first layer to the second layer (e.g., around the periphery) such that the lithium composition, the fourth layer, and the fifth layer are substantially contained within a chamber formed by the first layer, the second layer, and the seal (e.g., hermetic seal) between the first layer and the second layer. The first detection material and the second detection material are the same or different. The first layer having a first thickness and the second layer having a second thickness, wherein the first thickness and the second thickness are the same or different. The first thickness and the second thickness are configured such that tritium cannot pass through the first layer or the second layer. The first alpha particle blocking material and the second alpha particle blocking material are the same or different. The fourth layer has a fourth thickness and the fifth layer has a fifth thickness, wherein the fourth thickness and the fifth thickness are the same or different. The fourth thickness and the fifth thickness are configured such that alpha particles cannot pass through the fourth layer or the fifth layer, but tritium can pass through both the fourth layer and the fifth layer. The methods further comprise irradiating the lithium composition within the chamber with a neutron irradiation source; thereby producing tritium gas within the chamber that diffuses through the fourth layer and/or the fifth layer to the first layer and/or the second layer, and the tritium interacts with the first detection material and/or the second detection material to thereby form a signal. When alpha particles are produced within the chamber, then the alpha particles diffuse to and are captured by the fourth layer and/or the fifth layer. The methods further comprise detecting and analyzing the signal to determine a property of tritium, such as the presence or absence of tritium production, the amount or concentration of tritium produced, the rate of tritium production, or a combination thereof.

In some examples, the neutron irradiation source comprises a nuclear reactor, a thermal neutron beam, a thermal neutron source such as a thermalized Am—Be source, or a combination thereof.

In some examples, the neutron irradiation source has a neutron flux, such as from $1 \times 10^6$ to $5 \times 10^{13}$ $cm^{-2}s^{-1}$, or from $5 \times 10^6$ to $1.2 \times 10^{13}$ $cm^{-2}s^{-1}$.

In some examples, the lithium composition is irradiated within the chamber by the neutron irradiation source for an amount of time of from one second to 1 hour.

In some examples, the method further comprises separating the first layer and the second layer after irradiation and before detection.

In some examples, the method further comprises cleaning the first layer and the second layer after separation and before detection.

In some examples, detecting the signal comprises microscopic imaging and analyzing the signal comprises image analysis, such as manual or automated image analysis (e.g., AI assisted image analysis).

In some examples, the detection comprises a $4\pi$ solid angle of detection.

In some examples, the methods further comprise after detection and analysis, re-using the first layer and the second layer with a new lithium composition (e.g., repeating the methods).

Additional advantages of the disclosed devices and methods will be set forth in part in the description which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure. However, the present disclosure is not limited to the precise arrangements shown, and the drawings are not necessarily drawn to scale.

DETAILED DESCRIPTION

Figure 1:
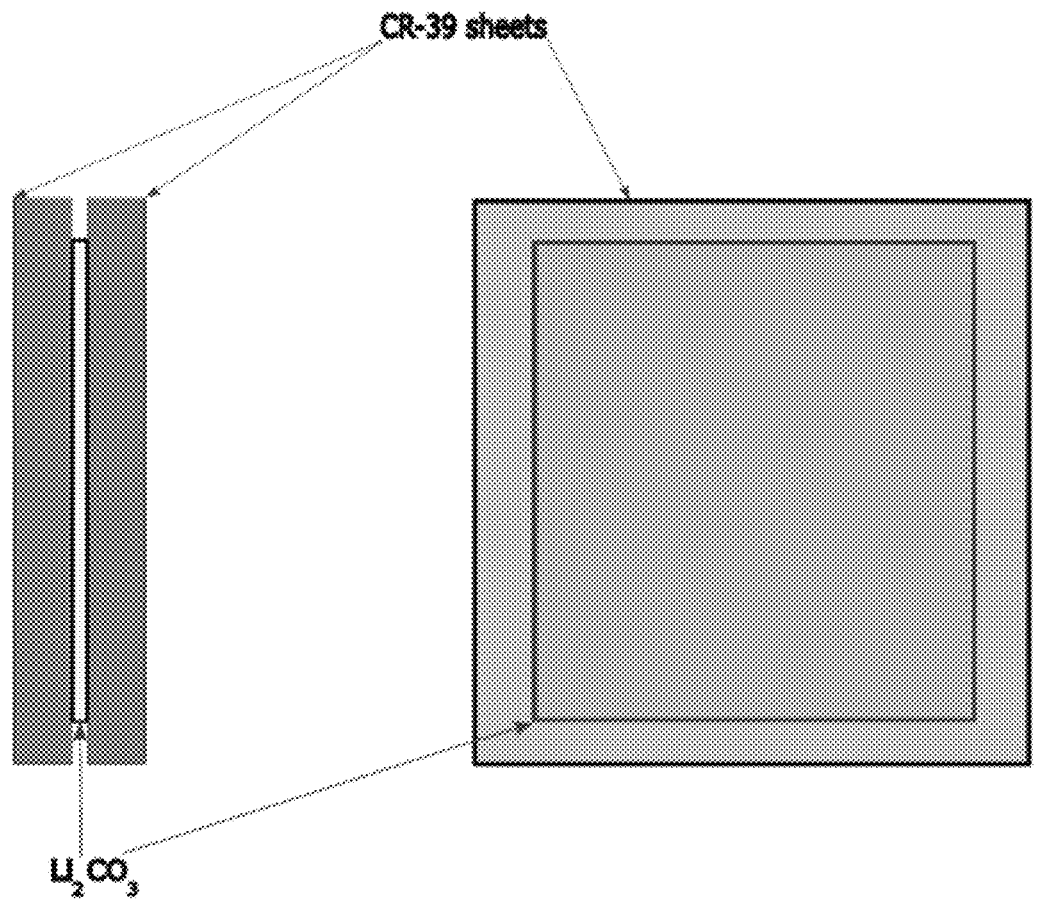
FIG. 1. Schematic diagram of lithium carbonate salt placed between sheets of CR-39 with a hermetic seal.

The devices and methods described herein may be understood more readily by reference to the following detailed description of specific aspects of the disclosed subject matter and the Examples included therein.

Before the present devices and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Devices 100

Disclosed herein are devices and methods for measuring tritium production.

Figure 4:
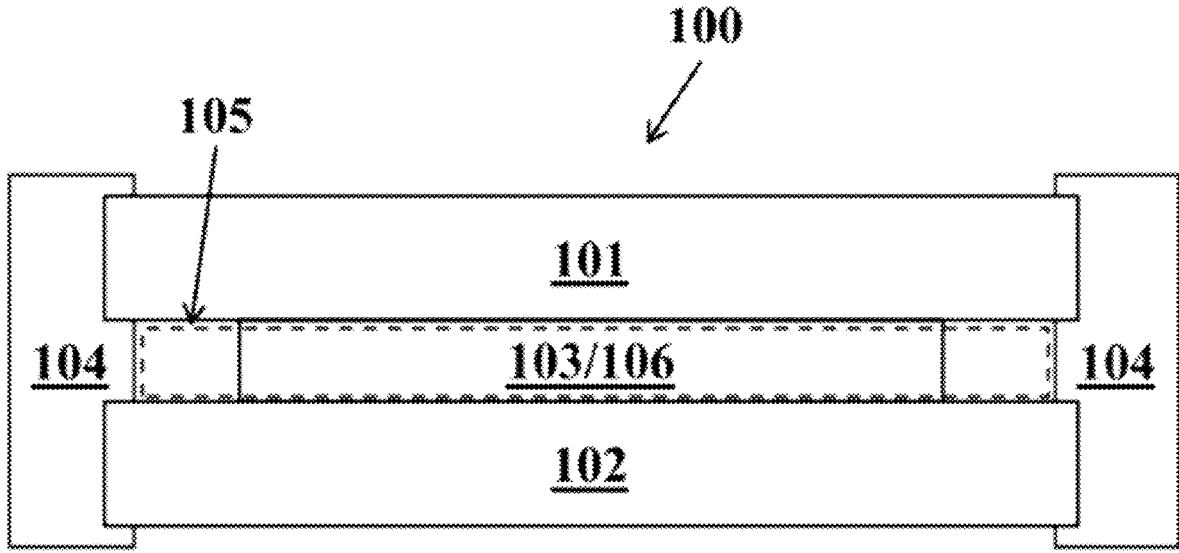
FIG. 4. A schematic cross-sectional plan view of an example device as disclosed herein according to one implementation.
Figure 5:
FIG. 5. A top down schematic cross-sectional plan view of the device of FIG. 4.
Figure 6:
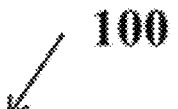
FIG. 6. A bottom up schematic cross-sectional plan view of the device of FIG. 4.

For example, referring now to FIG. 4-FIG. 6, disclosed herein are devices 100 for measuring tritium production, the devices 100 comprising a first layer 101 comprising a first detection material, and a second layer 102 comprising a second detection material, wherein the first detection material and the second detection material can be the same or different.

The first layer 101 has a first thickness and the second layer 102 has a second thickness, wherein the first thickness and the second thickness can be the same or different. The first thickness and the second thickness can be configured such that tritium cannot pass through the first layer 101 or the second layer 102.

When the device 100 is assembled together with a composition comprising lithium (e.g., a lithium composition 103), and a neutron irradiation source, such that the lithium composition 103 is in contact with and sandwiched between the first layer 101 and the second layer 102, the first layer and the second layer each having a perimeter which together form a periphery of the device 100, and the first layer 101 is sealed to the second layer 102 to form a seal 104 (e.g., around the periphery) such that the lithium composition 103 is substantially contained within a chamber 105 formed by the first layer 101, the second layer 102, and the seal 104;

and such that the neutron irradiation source is configured to irradiate the lithium composition 103 disposed within the chamber 105 formed by the first layer 101, the second layer 102, and the seal 104; then the device 100 produces tritium within the chamber 105 that diffuses to the first layer 101 and/or the second layer 102, and the tritium interacts with the first detection material and/or the second detection material to thereby form a signal that can be detected and analyzed to determine a property of tritium, such as the presence or absence of tritium production, the amount or concentration of tritium produced, the rate of tritium production, or a combination thereof.

In some examples, the device 100 further comprises the lithium composition 103.

In any of the devices 100 or methods disclosed herein, the lithium composition 103 can comprise any suitable composition comprising lithium. For example, the lithium composition 103 can comprise lithium metal.

In some examples, the lithium composition 103 comprises a lithium compound. Examples of lithium compounds include, but are not limited to, lithium carbonate, lithium hydroxide, lithium oxide, lithium chloride, lithium bicarbonate, lithium carbide, lithium beryllide, lithium lactate, lithium nitride, lithium hydride, n-butyllithium, lithium cobalt oxide, lithium sulfide, methyllithium, lithium iodide, lithium citrate, lithium succinate, ethyllithium, lithium hexafluorosilicate, lithium tantalate, lithium niobate, phenyllithium, lithium aluminate, lithium azide, and lithium aluminum hydride. In some examples, the lithium composition 103 comprises $Li_2CO_3$ and/or FLiBe.

The lithium composition 103 can be provided in any suitable form, such as, for example, a powder, a rod, a film, a molten salt, or a combination thereof.

In some examples, the lithium composition 103 comprises a third layer 106 sandwiched between the first layer 101 and the second layer 102, the third layer 106 having a third thickness configured to allow tritium to escape the lithium composition 103 and enter the first layer 101. In some examples, the third thickness can be 1 micrometer or more (e.g., 5 micrometers or more, 10 micrometers or more, 15 micrometers or more, 20 micrometers or more, 25 micrometers or more, 30 micrometers or more, 35 micrometers or more, 40 micrometers or more, 45 micrometers or more, 50 micrometers or more, 55 micrometers or more, 60 micrometers or more, 65 micrometers or more, 70 micrometers or more, 75 micrometers or more, 80 micrometers or more, 85 micrometers or more, 90 micrometers or more, or 95 micrometers or more). In some examples, the third thickness can be 100 micrometers or less (e.g., 95 micrometers or less, 90 micrometers or less, 85 micrometers or less, 80 micrometers or less, 75 micrometers or less, 70 micrometers or less, 65 micrometers or less, 60 micrometers or less, 55 micrometers or less, 50 micrometers or less, 45 micrometers or less, 40 micrometers or less, 35 micrometers or less, 30 micrometers or less, 25 micrometers or less, 20 micrometers or less, 15 micrometers or less, 10 micrometers or less, or 5 micrometers or less). The third thickness can range from any of the minimum values described above to any of the maximum values described above. For example, the third thickness can be from 1 to 100 micrometers (e.g., from 1 to 50 micrometers, from 50 to 100 micrometers, from 1 to 20 micrometers, from 20 to 40 micrometers, from 40 to 60 micrometers, from 60 to 80 micrometers, from 80 to 100 micrometers, from 1 to 80 micrometers, from 1 to 60 micrometers, from 1 to 40 micrometers, from 1 to 35 micrometers, from 1 to 30 micrometers, from 1 to 25 micrometers, from 1 to 20 micrometers, from 1 to 15 micrometers, from 1 to 10 micrometers, from 1 to 5 micrometers, from 5 to 100 micrometers, from 10 to 100 micrometers, from 15 to 100 micrometers, from 20 to 100 micrometers, from 25 to 100 micrometers, from 30 to 100 micrometers, from 35 to 100 micrometers, from 40 to 100 micrometers, from 60 to 100 micrometers, from 5 to 95 micrometers, or from 10 to 90 micrometers). In some examples, the third thickness is from 1 to 25 micrometers, or from 5 to 10 micrometers.

In some examples, the lithium composition 103 comprises natural lithium or enriched lithium (e.g., enriched with Li-6). In some examples, the lithium composition 103 is enriched with Li-6.

In some examples, the lithium composition 103 is 90% to 100% enriched with Li-6 (e.g., 95% enriched). For example, the lithium composition 103 can be 90% or more enriched with Li-6 (e.g., 91% or more, 92% or more, 93% or more, 94% or more, 95% or more, 96% or more, 97% or more, 98% or more, or 99% or more). In some examples, the lithium composition 103 can be 100% or less enriched with Li-6 (e.g., 99% or less, 98% or less, 97% or less, 96% or less, 95% or less, 94% or less, 93% or less, 92% or less, or 91% or less). The amount the lithium composition 103 is enriched with Li-6 can range from any of the minimum values described above to any of the maximum values described above. For example, the lithium composition 103 can be from 90% to 100% enriched with Li-6 (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 92% to 98%, or from 94% to 96%).

The first detection material and/or the second detection material comprise any suitable material, such as a material where triton particles have a limited range. In some examples, the first detection material and/or the second detection material independently comprises a polymer, such as CR-39, cellulose (e.g., cellulose nitrate), or a combination thereof. In some examples, the first detection material and the second detection material are the same. In some examples, the first detection material and the second detection material both comprise CR-39.

In some examples, the first thickness can be selected in view of the first detection material and the second thickness can be selected in view of the second detection material, such that the device 100 has sufficient rigidity and to selectively capture tritium within the first layer 101 and/or the second layer 102.

In some examples, the first thickness and/or the second thickness can independently be 0.1 millimeters or more (e.g., 0.25 millimeters or more, 0.5 millimeters or more, 0.75 millimeters or more, 1 millimeters or more, 1.25 millimeters or more, 1.5 millimeters or more, 1.75 millimeters or more, 2 millimeters or more, 2.25 millimeters or more, 2.5 millimeters or more, 3 millimeters or more, 3.5 millimeters or more, 4 millimeters or more, 4.5 millimeters or more, 5 millimeters or more, 6 millimeters or more, 7 millimeters or more, 8 millimeters or more, or 9 millimeters or more). In some examples, the first thickness and/or the second thickness can independently be 10 millimeters or less (e.g., 9 millimeters or less, 8 millimeters or less, 7 millimeters or less, 6 millimeters or less, 5 millimeters or less, 4.5 millimeters or less, 4 millimeters or less, 3.5 millimeters or less, 3 millimeters or less, 2.5 millimeters or less, 2.25 millimeters or less, 2 millimeters or less, 1.75 millimeters or less, 1.5 millimeters or less, 1.25 millimeters or less, 1 millimeters or less, 0.75 millimeters or less, 0.5 millimeters or less, or 0.25 millimeters or less). The first thickness and/or the second thickness can independently range from any of the minimum values described above to any of the maximum values described above. For example, the first thickness and/or the second thickness can independently be from 0.1 to 10 millimeters (e.g., from 0.1 to 5 millimeters, from 5 to 10 millimeters, from 0.1 to 2 millimeters, from 2 to 4 millimeters, from 4 to 6 millimeters, from 6 to 8 millimeters, from 8 to 10 millimeters, from 0.1 to 8 millimeters, from 0.1 to 6 millimeters, from 0.1 to 4 millimeters, from 0.1 to 1 millimeters, from 0.5 to 10 millimeters, from 1 to 10 millimeters, from 2 to 10 millimeters, from 4 to 10 millimeters, from 6 to 10 millimeters, from 0.25 to 9 millimeters, from 0.5 to 8 millimeters, from 1 to 5 millimeters, or from 0.25 to 1.5 millimeters). In some examples, the first thickness and the second thickness are the same.

In some examples, the first layer 101 and/or the second layer 102 can independently have a lateral surface are of 0.1 square centimeters ($cm^2$) or more (e.g., 0.25 $cm^2$ or more, 0.5 $cm^2$ or more, 0.75 $cm^2$ or more, 1 $cm^2$ or more, 1.25 $cm^2$ or more, 1.5 $cm^2$ or more, 1.75 $cm^2$ or more, 2 $cm^2$ or more, 2.25 $cm^2$ or more, 2.5 $cm^2$ or more, 3 $cm^2$ or more, 3.5 $cm^2$ or more, 4 $cm^2$ or more, 4.5 $cm^2$ or more, 5 $cm^2$ or more, 6 $cm^2$ or more, 7 $cm^2$ or more, 8 $cm^2$ or more, 9 $cm^2$ or more, 10 $cm^2$ or more, 15 $cm^2$ or more, 20 $cm^2$ or more, 25 $cm^2$ or more, 30 $cm^2$ or more, 35 $cm^2$ or more, 40 $cm^2$ or more, 45 $cm^2$ or more, 50 $cm^2$ or more, 60 $cm^2$ or more, 70 $cm^2$ or more, 80 $cm^2$ or more, or 90 $cm^2$ or more). In some examples, the first layer 101 and/or the second layer 102 can independently have a lateral surface are of 100 $cm^2$ or less (e.g., 90 $cm^2$ or less, 80 $cm^2$ or less, 70 $cm^2$ or less, 60 $cm^2$ or less, 50 $cm^2$ or less, 45 $cm^2$ or less, 40 $cm^2$ or less, 35 $cm^2$ or less, 30 $cm^2$ or less, 25 $cm^2$ or less, 20 $cm^2$ or less, 15 $cm^2$ or less, 10 $cm^2$ or less, 9 $cm^2$ or less, 8 $cm^2$ or less, 7 $cm^2$ or less, 6 $cm^2$ or less, 5 $cm^2$ or less, 4.5 $cm^2$ or less, 4 $cm^2$ or less, 3.5 $cm^2$ or less, 3 $cm^2$ or less, 2.5 $cm^2$ or less, 2.25 $cm^2$ or less, 2 $cm^2$ or less, 1.75 $cm^2$ or less, 1.5 $cm^2$ or less, 1.25 $cm^2$ or less, 1 $cm^2$ or less, 0.75 $cm^2$ or less, 0.5 $cm^2$ or less, or 0.25 $cm^2$ or less). The lateral surface area of the first layer 101 and/or the second layer 102 can independently range from any of the minimum values described above to any of the maximum values described above. For example, the first layer 101 and/or the second layer 102 can independently have a lateral surface are of from 0.1 to 100 $cm^2$ (e.g., from 0.1 to 50 $cm^2$, from 50 to 100 $cm^2$, from 0.1 to 20 $cm^2$, from 20 to 40 $cm^2$, from 40 to 60 $cm^2$, from 60 to 80 $cm^2$, from 80 to 100 $cm^2$, from 0.1 to 80 $cm^2$, from 0.1 to 60 $cm^2$, from 0.1 to 40 $cm^2$, from 0.1 to 30 $cm^2$, from 0.1 to 15 $cm^2$, from 0.1 to 10 $cm^2$, from 0.1 to 5 $cm^2$, from 0.1 to 2.5 $cm^2$, from 0.1 to 1 $cm^2$, from 0.5 to 100 $cm^2$, from 1 to 100 $cm^2$, from 5 to 100 $cm^2$, from 10 to 100 $cm^2$, from 15 to 100 $cm^2$, from 30 to 100 $cm^2$, from 40 to 100 $cm^2$, from 60 to 100 $cm^2$, from 0.25 to 90 $cm^2$, from 0.5 to 80 $cm^2$, or from 1 to 50 $cm^2$). In some examples, the first layer 101 and/or the second layer 102 can independently have a lateral surface area of from 0.1 to 10 $cm^2$. In some examples, the first layer 101 and/or the second layer 102 can independently have a lateral surface area of from 0.5 to 5 $cm^2$. In some examples, the first layer 101 and the second layer 102 can have the same lateral surface area.

In some examples, the first layer 101 and the second layer 102 are the same.

Figure 7:
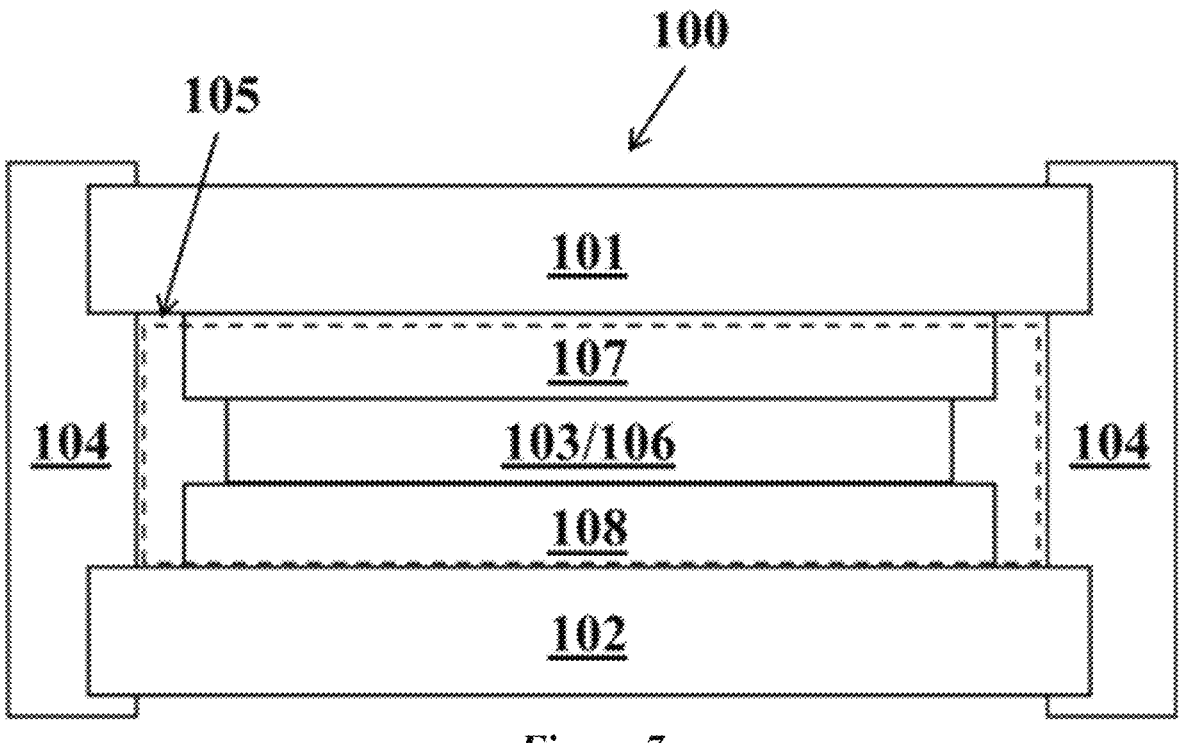
FIG. 7. A schematic cross-sectional plan view of an example device as disclosed herein according to one implementation.
Figure 8:
FIG. 8. A top down schematic cross-sectional plan view of the device of FIG. 7.
Figure 9:
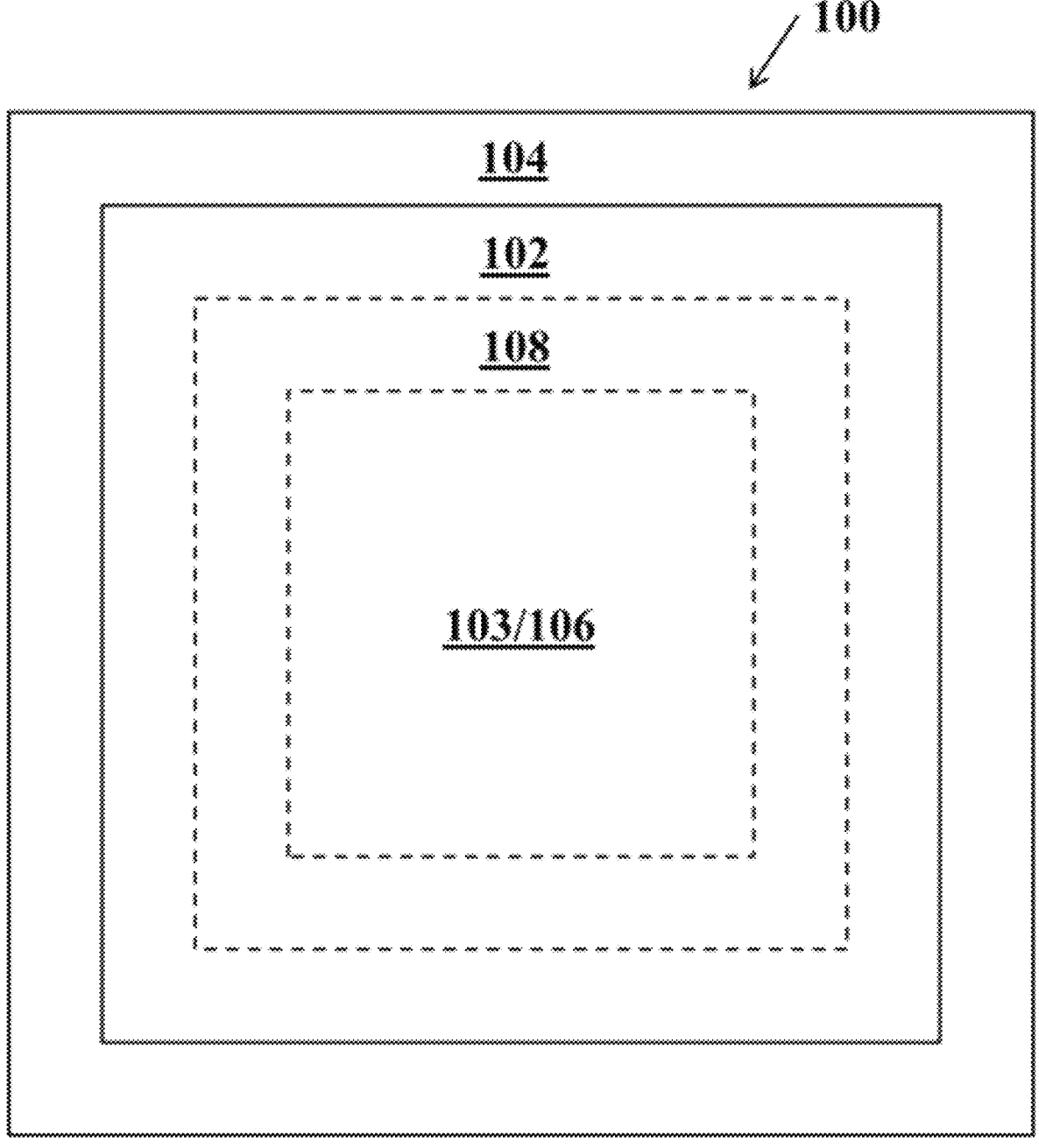
FIG. 9. A bottom up schematic cross-sectional plan view of the device of FIG. 7.

Referring now to FIG. 7-FIG. 9, in some examples the device 100 can further comprise a fourth layer 107 comprising a first alpha particle blocking material; and a fifth layer 108 comprising a second alpha particle blocking material; wherein the first alpha particle blocking material and the second alpha particle blocking material can be the same or different.

The fourth layer 107 has a fourth thickness and the fifth layer 108 has a fifth thickness, wherein the fourth thickness and the fifth thickness can be the same or different. The fourth thickness and the fifth thickness are configured such that alpha particles cannot pass through the fourth layer 107 or the fifth layer 108, but tritium can pass through both the fourth layer 107 and the fifth layer 108.

When the device 100 is assembled together with: the lithium composition 103; and the neutron irradiation source; such that: the lithium composition 103 is in contact with and sandwiched between the fourth layer 107 and the fifth layer 108; the fourth layer 107 is in contact with and sandwiched between the first layer 101 and the lithium composition 103; the fifth layer 108 is in contact with and sandwiched between the second layer 102 and the lithium composition 103; and the lithium composition 103, the fourth layer 107, and the fifth layer 108 are contained within the chamber 105 formed by the first layer 101, the second layer 102, and the seal 104; and then the device 100 produces tritium within the chamber 105 that diffuses through the fourth layer 107 and/or the fifth layer 108 to the first layer 101 and/or the second layer 102, and when the device 100 produces alpha particles within the chamber 105, then the alpha particles diffuse to and are captured by the fourth layer 107 and/or the fifth layer 108.

The first alpha particle blocking material and/or the second alpha particle blocking material can comprise any suitable material, such as a material where alpha particles have a limited range. In some examples, the first alpha particle blocking material and/or the second alpha particle blocking material comprises a polymer, such as Kapton, Mylar, or a combination thereof. In some examples, the first alpha particle blocking material and the second alpha particle blocking material are the same. In some examples, the first alpha particle blocking material and the second alpha particle blocking material both comprise Kapton.

In some examples, the fourth thickness is selected in view of the first alpha particle blocking material and the fifth thickness is selected in view of the second alpha particle blocking material, such that the device 100 selectively captures alpha particles within the fourth layer 107 and/or the fifth layer 108.

In some examples, the fourth layer 107 and the fifth layer 108 are the same.

The chamber 105 (e.g., formed from the first layer 101, the second layer 102, and the seal 104) can have any suitable shape and/or dimensions.

The seal 104 can be formed by any suitable methods. For example, the seal 104 can be formed using adhesive bonding (e.g., via an appropriate glue or other adhesive), tape fastening, mechanical fastening, heat sealing, or a combination thereof. In some examples, the seal 104 can be formed using adhesive bonding (e.g., via an appropriate glue or other adhesive), tape fastening, or a combination thereof. In some examples, the seal 104 can be formed using tape fastening, such as Kapton tape.

In some examples, the device 100 further comprises the neutron irradiation source configured to irradiate the lithium composition 103.

The neutron irradiation source can comprise any suitable neutron irradiation source. For example, the neutron irradiation source can comprise a nuclear reactor, a thermal neutron beam, a thermal neutron source such as a thermalized Am—Be source, or a combination thereof. In some examples, the neutron irradiation source can comprise D-D or DT neutron generator, and a laser based neutron source, an accelerator based neutron source, a nuclear reactor, a thermal neutron beam, a thermal neutron source such as a thermalized Am—Be source or a thermalized Pu—Be source, or a combination thereof.

In some examples, the neutron irradiation source has a neutron flux of $1\times10^6$ cm$^{-2}$s$^{-1}$ or more (e.g., $5\times10^6$ cm$^{-2}$s$^{-1}$ or more, $1\times10^7$ cm$^{-2}$s$^{-1}$ or more, $5\times10^7$ cm$^{-2}$s$^{-1}$ or more, $1\times10^8$ cm$^{-2}$s$^{-1}$ or more, $5\times10^8$ cm$^{-2}$s$^{-1}$ or more, $1\times10^9$ cm$^{-2}$s$^{-1}$ or more, $5\times10^9$ cm$^{-2}$s$^{-1}$ or more, $1\times10^{10}$ cm$^{-2}$s$^{-1}$ or more, $5\times10^{10}$ cm$^{-2}$s$^{-1}$ or more, $1\times10^{11}$ cm$^{-2}$s$^{-1}$ or more, $5\times10^{11}$ cm$^{-2}$s$^{-1}$ or more, $1\times10^{12}$ cm$^{-2}$s$^{-1}$ or more, $5\times10^{12}$ cm$^{-2}$s$^{-1}$ or more, or $1\times10^{13}$ cm$^{-2}$s$^{-1}$ or more). In some examples, the neutron irradiation source has a neutron flux of $5\times10^{13}$ cm$^{-2}$s$^{-1}$ or less (e.g., $1\times10^{13}$ cm$^{-2}$s$^{-1}$ or less, $5\times10^{12}$ cm$^{-2}$s$^{-1}$ or less, $1\times10^{12}$ cm$^{-2}$s$^{-1}$ or less, $5\times10^{11}$ cm$^{-2}$s$^{-1}$ or less, $1\times10^{11}$ cm$^{-2}$s$^{-1}$ or less, $5\times10^{10}$ cm$^{-2}$s$^{-1}$ or less, $1\times10^{10}$ cm$^{-2}$s$^{-1}$ or less, $5\times10^9$ cm$^{-2}$s$^{-1}$ or less, $1\times10^9$ cm$^{-2}$s$^{-1}$ or less, $5\times10^8$ cm$^{-2}$s$^{-1}$ or less, $1\times10^8$ cm$^{-2}$s$^{-1}$ or less, $5\times10^7$ cm$^{-2}$s$^{-1}$ or less, $1\times10^7$ cm$^{-2}$s$^{-1}$ or less, or $5\times10^6$ cm$^{-2}$s$^{-1}$ or less). The neutron flux of the neutron irradiation source can range from any of the minimum values described above to any of the maximum values described above. For example, the neutron irradiation source can have a neutron flux of from $1\times10^6$ to $5\times10^{13}$ cm$^{-2}$s$^{-1}$ (e.g., from $1\times10^6$ to $1\times10^{10}$ cm$^{-2}$s$^{-1}$, from $1\times10^{10}$ to $5\times10^{13}$ cm$^{-2}$s$^{-1}$, from $1\times10^6$ to $1\times10^8$ cm$^{-2}$s$^{-1}$, from $1\times10^8$ to $1\times10^{10}$ cm$^{-2}$s$^{-1}$, from $1\times10^{10}$ to $1\times10^{12}$ cm$^{-2}$s$^{-1}$, from $1\times10^{12}$ to $5\times10^{13}$ cm$^{-2}$s$^{-1}$, from $1\times10^6$ to $1\times10^{12}$ cm$^{-2}$s$^{-1}$, from $\times10^8$ to $5\times10^{13}$ cm$^{-2}$s$^{-1}$, or from $5\times10^6$ to $1.2\times10^{13}$ cm$^{-2}$s$^{-1}$).

Methods

Also disclosed herein are methods of use of any of the devices 100 herein, for example to measure tritium production.

Also disclosed herein are methods for measuring tritium production, the methods comprising disposing a composition comprising lithium (e.g., a lithium composition) between a first layer comprising a first detection material and a second layer comprising a second detection material, the first layer and the second layer each having a perimeter which together form a periphery, and sealing (e.g., hermetically sealing) the first layer to the second layer (e.g., around the periphery) such that the lithium composition is substantially contained within a chamber formed by the first layer, the second layer, and the seal (e.g., hermetic seal) between the first layer and the second layer. The first detection material and the second detection material can be the same or different. The first layer has a first thickness and the second layer has a second thickness, wherein the first thickness and the second thickness can be the same or different. The first thickness and the second thickness can be configured such that tritium cannot pass through the first layer or the second layer. The methods further comprise irradiating the lithium composition within the chamber with a neutron irradiation source, thereby producing tritium gas within the chamber that diffuses to the first layer and/or the second layer, and the tritium interacts with the first detection material and/or the second detection material to thereby form a signal. The methods further comprise detecting and analyzing the signal to determine a property of tritium, such as the presence or absence of tritium production, the amount or concentration of tritium produced, the rate of tritium production, or a combination thereof.

Also disclosed herein are methods for measuring tritium production, the methods comprising disposing a composition comprising lithium (e.g., a lithium composition) between a fourth layer comprising a first alpha particle blocking material and a fifth layer comprising a second alpha particle blocking material, thereby forming a first stack; and disposing the first stack between a first layer comprising a first detection material and a second layer comprising a second detection material; such that the lithium composition is in contact with and sandwiched between the fourth layer and the fifth layer, the fourth layer is in contact with and sandwiched between the first layer and the lithium composition, and the fifth layer is in contact with and sandwiched between the second layer and the lithium composition. The first layer and the second layer each having a perimeter which together form a periphery. The methods further comprise sealing (e.g., hermetically sealing) the first layer to the second layer (e.g., around the periphery) such that the lithium composition, the fourth layer, and the fifth layer are substantially contained within a chamber formed by the first layer, the second layer, and the seal (e.g., hermetic seal) between the first layer and the second layer. The first detection material and the second detection material can be the same or different. The first layer has a first thickness and the second layer has a second thickness, wherein the first thickness and the second thickness can be the same or different, and wherein the first thickness and the second thickness are configured such that tritium cannot pass through the first layer or the second layer. The first alpha particle blocking material and the second alpha particle blocking material can be the same or different. The fourth layer has a fourth thickness and the fifth layer has a fifth thickness, wherein the fourth thickness and the fifth thickness can be the same or different, and wherein the fourth thickness and the fifth thickness are configured such that alpha particles cannot pass through the fourth layer or the fifth layer, but tritium can pass through both the fourth layer and the fifth layer. The methods further comprise irradiating the lithium composition within the chamber with a neutron irradiation source, thereby producing tritium gas within the chamber that diffuses through the fourth layer and/or the fifth layer to the first layer and/or the second layer, and the tritium interacts with the first detection material and/or the second detection material to thereby form a signal. When alpha particles are produced within the chamber, then the alpha particles diffuse to and are captured by the fourth layer and/or the fifth layer. The methods further comprise detecting and analyzing the signal to determine a property of tritium, such as the presence or absence of tritium production, the amount or concentration of tritium produced, the rate of tritium production, or a combination thereof.

In some examples, the methods comprise using any of the devices 100 described herein.

The lithium composition can comprise any suitable composition comprising lithium. For example, the lithium composition can comprise lithium metal.

In some examples, the lithium composition comprises a lithium compound. Examples of lithium compounds include, but are not limited to, lithium carbonate, lithium hydroxide, lithium oxide, lithium chloride, lithium bicarbonate, lithium carbide, lithium beryllide, lithium lactate, lithium nitride, lithium hydride, n-butyllithium, lithium cobalt oxide, lithium sulfide, methyllithium, lithium iodide, lithium citrate, lithium succinate, ethyllithium, lithium hexafluorosilicate, lithium tantalate, lithium niobate, phenyllithium, lithium aluminate, lithium azide, and lithium aluminum hydride. In some examples, the lithium composition 103 comprises $Li_2CO_3$ and/or FLiBe.

The lithium composition can be provided in any suitable form, such as, for example, a powder, a rod, a film, a molten salt, or a combination thereof.

In some examples, the lithium composition comprises a third layer sandwiched between the first layer and the second layer, the third layer having a third thickness configured to allow tritium to escape the lithium composition and enter the first layer. In some examples, the third thickness can be 1 micrometer or more (e.g., 5 micrometers or more, 10 micrometers or more, 15 micrometers or more, 20 micrometers or more, 25 micrometers or more, 30 micrometers or more, 35 micrometers or more, 40 micrometers or more, 45 micrometers or more, 50 micrometers or more, 55 micrometers or more, 60 micrometers or more, 65 micrometers or more, 70 micrometers or more, 75 micrometers or more, 80 micrometers or more, 85 micrometers or more, 90 micrometers or more, or 95 micrometers or more). In some examples, the third thickness can be 100 micrometers or less (e.g., 95 micrometers or less, 90 micrometers or less, 85 micrometers or less, 80 micrometers or less, 75 micrometers or less, 70 micrometers or less, 65 micrometers or less, 60 micrometers or less, 55 micrometers or less, 50 micrometers or less, 45 micrometers or less, 40 micrometers or less, 35 micrometers or less, 30 micrometers or less, 25 micrometers or less, 20 micrometers or less, 15 micrometers or less, 10 micrometers or less, or 5 micrometers or less). The third thickness can range from any of the minimum values described above to any of the maximum values described above. For example, the third thickness can be from 1 to 100 micrometers (e.g., from 1 to 50 micrometers, from 50 to 100 micrometers, from 1 to 20 micrometers, from 20 to 40 micrometers, from 40 to 60 micrometers, from 60 to 80 micrometers, from 80 to 100 micrometers, from 1 to 80 micrometers, from 1 to 60 micrometers, from 1 to 40 micrometers, from 1 to 35 micrometers, from 1 to 30 micrometers, from 1 to 25 micrometers, from 1 to 20 micrometers, from 1 to 15 micrometers, from 1 to 10 micrometers, from 1 to 5 micrometers, from 5 to 100 micrometers, from 10 to 100 micrometers, from 15 to 100 micrometers, from 20 to 100 micrometers, from 25 to 100 micrometers, from 30 to 100 micrometers, from 35 to 100 micrometers, from 40 to 100 micrometers, from 60 to 100 micrometers, from 5 to 95 micrometers, or from 10 to 90 micrometers). In some examples, the third thickness is from 1 to 25 micrometers, or from 5 to 10 micrometers.

In some examples, the lithium composition comprises natural lithium or enriched lithium (e.g., enriched with Li-6). In some examples, the lithium composition is enriched with Li-6.

In some examples, the lithium composition is 90% to 100% enriched with Li-6 (e.g., 95% enriched). For example, the lithium composition can be 90% or more enriched with Li-6 (e.g., 91% or more, 92% or more, 93% or more, 94% or more, 95% or more, 96% or more, 97% or more, 98% or more, or 99% or more). In some examples, the lithium composition 103 can be 100% or less enriched with Li-6 (e.g., 99% or less, 98% or less, 97% or less, 96% or less, 95% or less, 94% or less, 93% or less, 92% or less, or 91% or less). The amount the lithium composition is enriched with Li-6 can range from any of the minimum values described above to any of the maximum values described above. For example, the lithium composition can be from 90% to 100% enriched with Li-6 (e.g., from 90% to 95%, from 95% to 100%, from 90% to 92%, from 92% to 94%, from 94% to 96%, from 96% to 98%, from 98% to 100%, from 90% to 98%, from 90% to 96%, from 90% to 94%, from 92% to 100%, from 94% to 100%, from 96% to 100%, from 92% to 98%, or from 94% to 96%).

The first detection material and/or the second detection material comprise any suitable material, such as a material where triton particles have a limited range. In some examples, the first detection material and/or the second detection material independently comprises a polymer, such as CR-39, cellulose (e.g., cellulose nitrate), or a combination thereof. In some examples, the first detection material and the second detection material are the same. In some examples, the first detection material and the second detection material both comprise CR-39.

In some examples, the first thickness can be selected in view of the first detection material and the second thickness can be selected in view of the second detection material, such that there is sufficient rigidity and selectively to capture tritium within the first layer and/or the second layer.

In some examples, the first thickness and/or the second thickness can independently be 0.1 millimeters or more (e.g., 0.25 millimeters or more, 0.5 millimeters or more, 0.75 millimeters or more, 1 millimeters or more, 1.25 millimeters or more, 1.5 millimeters or more, 1.75 millimeters or more, 2 millimeters or more, 2.25 millimeters or more, 2.5 millimeters or more, 3 millimeters or more, 3.5 millimeters or more, 4 millimeters or more, 4.5 millimeters or more, 5 millimeters or more, 6 millimeters or more, 7 millimeters or more, 8 millimeters or more, or 9 millimeters or more). In some examples, the first thickness and/or the second thickness can independently be 10 millimeters or less (e.g., 9 millimeters or less, 8 millimeters or less, 7 millimeters or less, 6 millimeters or less, 5 millimeters or less, 4.5 millimeters or less, 4 millimeters or less, 3.5 millimeters or less, 3 millimeters or less, 2.5 millimeters or less, 2.25 millimeters or less, 2 millimeters or less, 1.75 millimeters or less, 1.5 millimeters or less, 1.25 millimeters or less, 1 millimeters or less, 0.75 millimeters or less, 0.5 millimeters or less, or 0.25 millimeters or less). The first thickness and/or the second thickness can independently range from any of the minimum values described above to any of the maximum values described above. For example, the first thickness and/or the second thickness can independently be from 0.1 to 10 millimeters (e.g., from 0.1 to 5 millimeters, from 5 to 10 millimeters, from 0.1 to 2 millimeters, from 2 to 4 millimeters, from 4 to 6 millimeters, from 6 to 8 millimeters, from 8 to 10 millimeters, from 0.1 to 8 millimeters, from 0.1 to 6 millimeters, from 0.1 to 4 millimeters, from 0.1 to 1 millimeters, from 0.5 to 10 millimeters, from 1 to 10 millimeters, from 2 to 10 millimeters, from 4 to 10 millimeters, from 6 to 10 millimeters, from 0.25 to 9 millimeters, from 0.5 to 8 millimeters, from 1 to 5 millimeters, or from 0.25 to 1.5 millimeters). In some examples, the first thickness and the second thickness are the same.

In some examples, the first layer and/or the second layer can independently have a lateral surface are of 0.1 square centimeters ($cm^2$) or more (e.g., 0.25 $cm^2$ or more, 0.5 $cm^2$ or more, 0.75 $cm^2$ or more, 1 $cm^2$ or more, 1.25 $cm^2$ or more, 1.5 $cm^2$ or more, 1.75 $cm^2$ or more, 2 $cm^2$ or more, 2.25 $cm^2$ or more, 2.5 $cm^2$ or more, 3 $cm^2$ or more, 3.5 $cm^2$ or more, 4 $cm^2$ or more, 4.5 $cm^2$ or more, 5 $cm^2$ or more, 6 $cm^2$ or more, 7 $cm^2$ or more, 8 $cm^2$ or more, 9 $cm^2$ or more, 10 $cm^2$ or more, 20 $cm^2$ or more, 25 $cm^2$ or more, 30 $cm^2$ or more, 35 $cm^2$ or more, 40 $cm^2$ or more, 45 $cm^2$ or more, 50 $cm^2$ or more, 60 $cm^2$ or more, 70 $cm^2$ or more, 80 $cm^2$ or more, or 90 $cm^2$ or more). In some examples, the first layer 101 and/or the second layer 102 can independently have a lateral surface are of 100 $cm^2$ or less (e.g., 90 $cm^2$ or less, 80 $cm^2$ or less, 70 $cm^2$ or less, 60 $cm^2$ or less, 50 $cm^2$ or less, 45 $cm^2$ or less, 40 cm² or less, 35 cm² or less, 30 cm² or less, 25 cm² or less, 20 cm² or less, 15 cm² or less, 10 cm² or less, 9 cm² or less, 8 cm² or less, 7 cm² or less, 6 cm² or less, 5 cm² or less, 4.5 cm² or less, 4 cm² or less, 3.5 cm² or less, 3 cm² or less, 2.5 cm² or less, 2.25 cm² or less, 2 cm² or less, 1.75 cm² or less, 1.5 cm² or less, 1.25 cm² or less, 1 cm² or less, 0.75 cm² or less, 0.5 cm² or less, or 0.25 cm² or less). The lateral surface area of the first layer and/or the second layer can independently range from any of the minimum values described above to any of the maximum values described above. For example, the first layer and/or the second layer can independently have a lateral surface are of from 0.1 to 100 cm² (e.g., from 0.1 to 50 cm², from 50 to 100 cm², from 0.1 to 20 cm², from 20 to 40 cm², from 40 to 60 cm², from 60 to 80 cm², from 80 to 100 cm², from 0.1 to 80 cm², from 0.1 to 60 cm², from 0.1 to 40 cm², from 0.1 to 30 cm², from 0.1 to 15 cm², from 0.1 to 10 cm², from 0.1 to 5 cm², from 0.1 to 2.5 cm², from 0.1 to 1 cm², from 0.5 to 100 cm², from 1 to 100 cm², from 5 to 100 cm², from 10 to 100 cm², from 15 to 100 cm², from 30 to 100 cm², from 40 to 100 cm², from 60 to 100 cm², from 0.25 to 90 cm², from 0.5 to 80 cm², or from 1 to 50 cm²). In some examples, the first layer and/or the second layer can independently have a lateral surface area of from 0.1 to 10 cm². In some examples, the first layer and/or the second layer can independently have a lateral surface area of from 0.5 to 5 cm². In some examples, the first layer and the second layer can have the same lateral surface area.

In some examples, the first layer and the second layer are the same.

The first alpha particle blocking material and/or the second alpha particle blocking material can comprise any suitable material, such as a material where alpha particles have a limited range. In some examples, the first alpha particle blocking material and/or the second alpha particle blocking material comprises a polymer, such as Kapton, Mylar, or a combination thereof. In some examples, the first alpha particle blocking material and the second alpha particle blocking material are the same. In some examples, the first alpha particle blocking material and the second alpha particle blocking material both comprise Kapton.

In some examples, the fourth thickness is selected in view of the first alpha particle blocking material and the fifth thickness is selected in view of the second alpha particle blocking material, such alpha particles are selectively captured within the fourth layer and/or the fifth layer.

In some examples, the fourth layer and the fifth layer are the same.

The chamber (e.g., formed from the first layer, the second layer, and the seal) can have any suitable shape and/or dimensions.

The sealing can comprise any suitable methods. For example, the seal can be formed using adhesive bonding (e.g., via an appropriate glue or other adhesive), tape fastening, mechanical fastening, heat sealing, or a combination thereof. In some examples, the seal can be formed using adhesive bonding (e.g., via an appropriate glue or other adhesive), tape fastening, or a combination thereof. In some examples, the seal can be formed using tape, such as Kapton tape.

The neutron irradiation source can comprise any suitable neutron irradiation source. For example, the neutron irradiation source can comprise a nuclear reactor, a thermal neutron beam, a thermal neutron source such as a thermalized Am—Be source, or a combination thereof. In some examples, the neutron irradiation source can comprise D-D or DT neutron generator, and a laser based neutron source, an accelerator based neutron source, a nuclear reactor, a thermal neutron beam, a thermal neutron source such as a thermalized Am—Be source or a thermalized Pu—Be source, or a combination thereof.

In some examples, the neutron irradiation source has a neutron flux of $1 \times 10^6$ cm$^{-2}$s$^{-1}$ or more (e.g., $5 \times 10^6$ cm$^{-2}$s$^{-1}$ or more, $1 \times 10^7$ cm$^{-2}$s$^{-1}$ or more, $5 \times 10^7$ cm$^{-2}$s$^{-1}$ or more, $1 \times 10^8$ cm$^{-2}$s$^{-1}$ or more, $5 \times 10^8$ cm$^{-2}$s$^{-1}$ or more, $1 \times 10^9$ cm$^{-2}$s$^{-1}$ or more, $5 \times 10^9$ cm$^{-2}$s$^{-1}$ or more, $1 \times 10^{10}$ cm$^{-2}$s$^{-1}$ or more, $5 \times 10^{10}$ cm$^{-2}$s$^{-1}$ or more, $1 \times 10^{11}$ cm$^{-2}$s$^{-1}$ or more, $5 \times 10^{11}$ cm$^{-2}$s$^{-1}$ or more, $1 \times 10^{12}$ cm$^{-2}$s$^{-1}$ or more, $5 \times 10^{12}$ cm$^{-2}$s$^{-1}$ or more, or $1 \times 10^{13}$ cm$^{-2}$s$^{-1}$ or more). In some examples, the neutron irradiation source has a neutron flux of $5 \times 10^{13}$ cm$^{-2}$s$^{-1}$ or less (e.g., $1 \times 10^{13}$ cm$^{-2}$s$^{-1}$ or less, $5 \times 10^{12}$ cm$^{-2}$s$^{-1}$ or less, $1 \times 10^{12}$ cm$^{-2}$s$^{-1}$ or less, $5 \times 10^{11}$ cm$^{-2}$s$^{-1}$ or less, $1 \times 10^{11}$ cm$^{-2}$s$^{-1}$ or less, $5 \times 10^{10}$ cm$^{-2}$s$^{-1}$ or less, $1 \times 10^{10}$ cm$^{-2}$s$^{-1}$ or less, $5 \times 10^9$ cm$^{-2}$s$^{-1}$ or less, $1 \times 10^9$ cm$^{-2}$s$^{-1}$ or less, $5 \times 10^8$ cm$^{-2}$s$^{-1}$ or less, $1 \times 10^8$ cm$^{-2}$s$^{-1}$ or less, $5 \times 10^7$ cm$^{-2}$s$^{-1}$ or less, $1 \times 10^7$ cm$^{-2}$s$^{-1}$ or less, or $5 \times 10^6$ cm$^{-2}$s$^{-1}$ or less). The neutron flux of the neutron irradiation source can range from any of the minimum values described above to any of the maximum values described above. For example, the neutron irradiation source can have a neutron flux of from $1 \times 10^6$ to $5 \times 10^3$ cm$^{-2}$s$^{-1}$ (e.g., from $1 \times 10^6$ to $1 \times 10^{10}$ cm$^{-2}$s$^{-1}$, from $1 \times 10^{10}$ to $5 \times 10^{13}$ cm$^{-2}$s$^{-1}$, from $1 \times 10^6$ to $1 \times 10^8$ cm$^{-2}$s$^{-1}$, from $1 \times 10^8$ to $1 \times 10^{10}$ cm$^{-2}$s$^{-1}$, from $1 \times 10^{10}$ to $1 \times 10^{12}$ cm$^{-2}$s$^{-1}$, from $1 \times 10^{12}$ to $5 \times 10^{13}$ cm$^{-2}$s$^{-1}$, from $1 \times 10^6$ to $1 \times 10^{12}$ cm$^{-2}$s$^{-1}$, from $\times 10^8$ to $5 \times 10^{13}$ cm$^{-2}$s$^{-1}$, or from $5 \times 10^6$ to $1.2 \times 10^{13}$ cm$^{-2}$s$^{-1}$).

In some examples, the lithium composition is irradiated within the chamber by the neutron irradiation source for an amount of time of one second or more (e.g., 5 seconds or more, 10 seconds or more, 15 seconds or more, 20 seconds or more, 25 seconds or more, 30 seconds or more, 40 seconds or more, 50 seconds or more, 1 minute or more, 1.25 minutes or more, 1.5 minutes or more, 1.75 minutes or more, 2 minutes or more, 2.25 minutes or more, 2.5 minutes or more, 3 minutes or more, 3.5 minutes or more, 4 minutes or more, 4.5 minutes or more, 5 minutes or more, 6 minutes or more, 7 minutes or more, 8 minutes or more, 9 minutes or more, 10 minutes or more, 15 minutes or more, 20 minutes or more, 25 minutes or more, 30 minutes or more, 35 minutes or more, 40 minutes or more, 45 minutes or more, 50 minutes or more, or 55 minutes or more). In some examples, the lithium composition can be irradiated within the chamber by the neutron irradiation source for an amount of time of 1 hour or less (e.g., 55 minutes or less, 50 minutes or less, 45 minutes or less, 40 minutes or less, 35 minutes or less, 30 minutes or less, 25 minutes or less, 20 minutes or less, 15 minutes or less, 10 minutes or less, 9 minutes or less, 8 minutes or less, 7 minutes or less, 6 minutes or less, 5 minutes or less, 4.5 minutes or less, 4 minutes or less, 3.5 minutes or less, 3 minutes or less, 2.5 minutes or less, 2.25 minutes or less, 2 minutes or less, 1.75 minutes or less, 1.5 minutes or less, 1.25 minutes or less, 1 minute or less, 50 seconds or less, 40 seconds or less, 30 seconds or less, 25 seconds or less, 20 seconds or less, 15 seconds or less, 10 seconds or less, or 5 seconds or less). The amount of time that the lithium composition is irradiated within the chamber by the neutron irradiation source can range from any of the minimum values described above to any of the maximum values described above. For example, the lithium composition can be irradiated within the chamber by the neutron irradiation source for an amount of time of from one second to 1 hour (e.g., from 1 second to 30 minutes, from 30 minutes to 1 hour, from 1 second to 15 minutes, from 15 minutes to 30 minutes, from 30 minutes to 45 minutes, from 45 minutes to 1 hour, from 1 second to 45 minutes, from 1 second to 20 minutes, from 1 second to 10 minutes, from 1 second to 5 minutes, from 1 second to 1 minute, from 1 second to 30 seconds, from 1 second to 10 seconds, from 5 seconds to 1 hour, from 10 seconds to 1 hour, from 30 seconds to 1 hour, from 1 minute to 1 hour, from 5 minutes to 1 hour, from 10 minutes to 1 hour, from 20 minutes to 1 hour, from 40 minutes to 1 hour, from 5 seconds to 55 minutes, or from 10 seconds to 50 minutes). In some examples, the lithium composition can be irradiated within the chamber by the neutron irradiation source for an amount of time of from one second to 10 minutes or from 1 second to 1 minute.

In some examples, the method further comprises separating the first layer and the second layer after irradiation and before detection. In some examples, the method further comprises cleaning the first layer and the second layer after separation and before detection.

In some examples, detecting the signal comprises microscopic imaging and analyzing the signal comprises image analysis, such as manual or automated image analysis (e.g., AI assisted image analysis). In some examples, the detection comprises a 47<solid angle of detection.

In some examples, the methods further comprise, after detection and analysis, re-using the first layer and the second layer with a new lithium composition (e.g., repeating the methods).

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Tritium gas can be produced through a variety of methods. However, it is difficult to measure tritium production. The devices and methods discussed herein address this and other needs, such as where tritium is produced through lithium-6 neutron capture reaction in lithium metal or compound, and in different format such as power, rod, plate, or in solid, liquid, or gaseous.

The devices and methods described herein relate to tritium production using lithium or lithium compounds, based on the Li-6(n,alpha)H-3 reaction. CR-39 is used to passively detect tritium particles by placing CR-39 in close contact with lithium or lithium compounds, followed by chemical etching and image readout by microscope. Applying CR-39 to passively receive tritium atom bombardment results in tracks with a one-to-one ratio, serving as the basis to detect and quantify lithium during the production process.

Example 2—Method for Measuring Tritium Production Rates from Lithium Salts Using CR-39

CR-39 plastic is used to track triton particles produced by lithium-6 in lithium salts, such as lithium carbonate or FLiBe, when the sample is placed in or near a neutron source. The lithium salt is deposited in a very thin layer onto one sheet of CR-39, and another sheet is placed over top and sealed to provide a 4-π solid angle of detection.

The sample is placed in or near a neutron source. Possible sources include a nuclear reactor, a thermal neutron beam, and a thermal neutron source such as a thermalized Am—Be source. In some examples, the neutron source can comprise D-D or DT neutron generator, and a laser based neutron source, an accelerator based neutron source, a nuclear reactor, a thermal neutron beam, a thermal neutron source such as a thermalized Am—Be source, or a combination thereof.

The sample is placed in a known neutron flux for a time determined by the amount of salt being used. This can range from less than one second to many minutes. After irradiation, the two CR-39 plates are split from each other, cleaned, and placed under a microscope. The microscope is adjusted so that the tracks from the 2.75 MeV tritons generated from Li-6 interactions with thermal neutrons are visible. Images of randomly selected areas of both plates are selected and recorded from the microscope. The tracks in each image are counted, and the track densities of both plates can be used to calculate the tritium production yield of the lithium compound sample.

This method of detection has several advantages. Because a thin layer of material is surrounded on both sides by the detecting material, the solid angle of detection is almost 4-π. Additionally, because the emitted tritons have a limited range in CR-39, all particles generated can be recorded so long as the sample layer is thin enough and the CR-39 plates are thick enough. The CR-39 plates can be reexamined multiple times, as the energy of the beta particles emitted by the tracked tritons is about 480 times less than the energy of the initial triton energy. This can allow for clear tracks that are clearly visible for multiple evaluations, if needed.

This method of tritium rate production measurement can benefit molten salt reactor applications; FLiBe salts will contain some Li-6 and produce tritium during normal operation. If the tritium production rate of a FLiBe sample can be measured, the rate of tritium production for a large quantity of FLiBe can be predicted to ensure safe reactor operation and adequate measures for tritium mitigation.

Example 3—Tritium Yield Measurement for a High Purity Tritium Gas Production Method Methods of tritium gas production are being investigated with the tritium gas processing facility has been established. An aspect of the production facility is to measure tritium yield in high sensitivity. Highly purified tritium gas is desired for fusion and for neutron generators based on D-T reaction. For tritium gas production, a lithium compound with enriched lithium-6 can be irradiated in-core or ex-core to harvest the triton particles, leading to a pure tritium gas production, although in small quantify, that is sufficient to be used to fuel a portable neuron generator. An important aspect of the facility is to determine the Lithium-6 neutron capture rate, i.e., the tritium gas production rate, using the nuclear track method. In this method, CR-39 is utilized to capture triton particles, which can then be readout by microscopy. This measurement can be conducted using an external neutron beam, which provides 100% detection efficiency if triton is emitted into CR-39. Furthermore, the solid angle of detection can be nearly 2-$\pi$ if one CR-39 is applied, or 4-$\pi$ if two CR-39 are applied.

Tritium gas production and yield measurement. There are no current dedicated tritium production processes for producing high purity tritium gas for use in a portable neutron generator. The production of tritium for fusion applications occurs in nuclear reactors as a byproduct of fission processes or from sources such as lithium-6, D, or beryllium-10. To verify the rate of tritium production, $Li_2CO_3$ salt is exposed to a high neutron flux ($1.2 \times 10^{13}$ cm$^{-2}$s$^{-1}$) in core at a research reactor or with one external neutron beam line at a reduced thermal flux ($5 \times 10^6$ cm$^{-2}$s$^{-1}$). The $Li_2CO_3$ salt is 95% enriched in lithium-6, which is placed as a thin layer between two sheets of CR-39, each with an area of 1.0 cm$^2$. The layer of salt should be thin enough to allow the escape of triton particles so that those produced by lithium-6 neutron capture can be absorbed and tracked in the CR-39 sheets. Multiple samples can be placed in the reactor or in the beam line at varying power levels to measure the reaction rate of tritium gas generation. Tracks left in the CR-39 sheets will be counted under microscope but could also be counted and recorded with an image processing AI model. This computer model could help to alleviate miscounts from neutron interactions with CR-39, or from counting tracks created by other charged particles.

Sensitivity of the nuclear track method for tritium yield measurement. Determining the yield of tritium is important for designing a tritium gas production facility and for conducting safety analysis. It is important to apply $Li_2CO_3$ thinly enough to allow the escape of tritons but thick enough to maintain adequate sensitivity. To conduct this analysis, samples of $Li_2CO_3$ salt are spread in a thin uniform layer with an area of 1.0 cm$^2$ on a piece of CR-39. Another piece of CR-39 is placed on top of the salt layer, and both pieces of detection material are bonded hermetically to prevent any material from leaking out (FIG. 1). These samples are then sent into the core using a pneumatic rabbit tube, irradiated for a set amount of time (seconds to minutes), and then temporarily stored in a pig to allow for short-lived isotopes to decay. This methodology can help accurately determine the yield of tritium production, which is essential for the safe and effective design of a tritium gas production facility.

The irradiated samples will be removed and analyzed under a microscope to count tracks formed in the CR-39 sheets by triton. The number of tracks generated, coupled with the known flux in the reactor and the amount of time the sample was irradiated can be used to determine the rate of tritium production in $Li_2CO_3$ salts containing high enriched lithium-6. The calculation shows that there will be $2.6 \times 10^9$ tritons produced after 1 minute irradiation assuming a thermal neutron flux of $5.0 \times 10^{12}$ cm$^{-2}$s$^{-1}$. An experiment utilizing a neutron beam would instead place the sample in line with the beam to enable a low yield production but also low risk of damaging CR-39 films. With thermal neutron flux at $5.0 \times 10^6$ cm$^{-2}$s$^{-1}$, the tritium yield is still at $2.6 \times 10^3$ for one second irradiation. Both irradiations will produce more than enough tracks for number counting, leaving an ultra-high sensitivity for tritium measurement.

Figure 2:
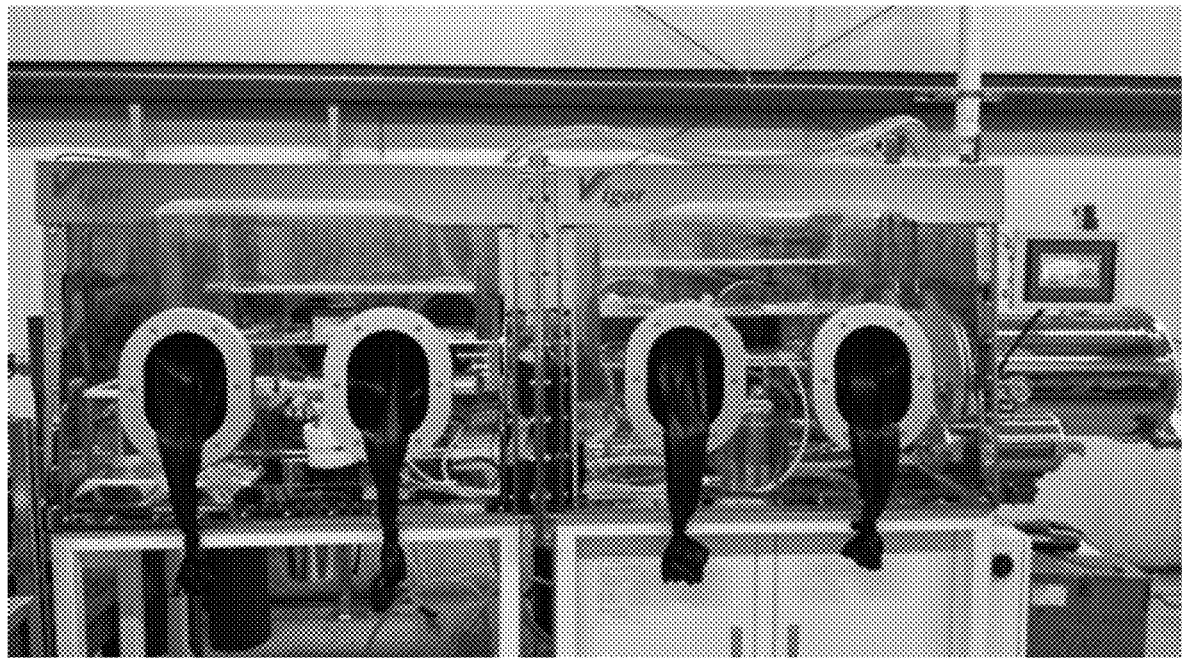
FIG. 2. Photograph of a customized glove box with molten salt and tritium gas handling capabilities.

Glovebox and gamma spectrum counting. A customized glovebox with a furnace and gas extraction for handling irradiated molten salt has been established (FIG. 2). Tritium processing procedure has been established and the safety operation procedures have been passed by the Radiation Safety office.

Example 4—Triton Production from $Li_2CO_3$: CR-39 4$\pi$ Detection Experiments

This experiment was designed to measure the rate of triton (and in effect, tritium) production from $Li_2CO_3$ samples containing $^6Li$ in both natural and enriched (~95%) quantities. A thin layer of $Li_2CO_3$ salt can be solution-deposited on a sheet of CR-39 plastic (e.g., allyl diglycol carbonate (ADC) or polymers or derivatives thereof, such as poly(allyl diglycol carbonate), PADC), and be sealed with another sheet of CR-39.

Presented herein are calculated values for triton produced in an experiment. Calculations are performed for a 1.0 cm×1.0 cm×10 $\mu$m layer of $Li_2CO_3$ salt containing $^6Li$ in natural abundance or 95% enrichment.

Calculations and Triton Production. The salt layer can be ~10 $\mu$m thick and 1.0 cm$^2$ in area. This amounts to ~2.11× $10^{-3}$ g based on a $Li_2CO_3$ density of 2.11 g cm$_{-3}$. The same density is used for both enriched and unenriched $Li_2CO_3$ salts.

Full-power flux will be assumed for experiments at the facilities in Table 1.

TABLE 1

Thermal neutron flux for the thermal beam and pneumatic rabbit facility at the sample position, assuming full-power operation.

| Facility | Thermal Flux at Sample Position |
|---|---|
| Thermal Beam | $4 \times 10^6$ cm$^{-2}$s$^{-1}$ |
| Rabbit Facility | $2 \times 10^{12}$ cm$^{-2}$s$^{-1}$ |

The number of triton produced in a sample at each facility is presented in Table 2. Also listed are possible experiment duration times. Activities for samples at each facility and irradiation time are presented in Table 3.

The worst case scenario analysis is a 7-hour irradiation of a sample. For either case of $^6Li$ enrichment, the amount of triton and activity that will be produced is listed in Table 4 and Table 5.

TABLE 2

Irradiation times for samples with natural $^6Li$ and 95% $^6Li$.

| Experimental Facility and Time | Nat. $^6Li$ tritons produced | 95% $^6Li$ tritons produced |
|---|---|---|
| Thermal Beam, 10 minutes | $3.86 \times 10^6$ | $7.56 \times 10^7$ |
| Thermal Beam, 20 minutes | $7.72 \times 10^6$ | $1.51 \times 10^8$ |
| Thermal Beam, 30 minutes | $1.16 \times 10^7$ | $2.27 \times 10^8$ |
| Thermal Beam, 60 minutes | $2.31 \times 10^7$ | $4.53 \times 10^8$ |
| Rabbit Facility, 1 second | $3.22 \times 10^9$ | $6.30 \times 10^{11}$ |
| Rabbit Facility, 10 seconds | $3.22 \times 10^9$ | $6.30 \times 10^{12}$ |

TABLE 3

Irradiation times and activities for
samples with natural $^6$Li and 95% $^6$Li.

| Experimental Facility and Time | Nat. $^6$Li | 95% $^6$Li |
|---|---|---|
| Thermal Beam, 10 minutes | 0.1859 pCi | 3.6416 pCi |
| Thermal Beam, 20 minutes | 0.3718 pCi | 7.2832 pCi |
| Thermal Beam, 30 minutes | 0.5577 pCi | 10.9248 pCi |
| Thermal Beam, 60 minutes | 1.1155 pCi | 21.8497 pCi |
| Rabbit Facility, 1 second | $1.5493 \times 10^2$ pCi | $3.03468 \times 10^3$ pCi |
| Rabbit Facility, 10 seconds | $1.54928 \times 10^3$ pCi | $3.03468 \times 10^4$ pCi |

TABLE 4

Worst-case scenario for triton produced in
a 7 hour irradiation in the rabbit tube.

| $^6$Li-enrichment | Triton Activity Produced over 7 hour irradiation (μCi) |
|---|---|
| Nat. $^6$Li | 3.9042 |
| 95% $^6$Li | 76.4739 |

TABLE 5

Worst-case scenario for triton produced in
a 7 hour irradiation in the thermal beam.

| $^6$Li-enrichment | Triton Activity Produced over 7 hour irradiation (nCi) |
|---|---|
| Nat. $^6$Li | $7.8084 \times 10^{-3}$ |
| 95% $^6$Li | $1.5295 \times 10^{-1}$ |

Mathematica Calculations. Mathematica notebook used to calculate values presented herein. A 10 μm-thick layer of $Li_2CO_3$ was used for the calculations.

Calculations for CR-39 $Li_2CO_3$ irradiation. Calculate the yield of triton from 1.0 cm$^2$ of 10 μm thick layer of $Li_2CO_3$ in a thermal flux of 2E12 cm$^{-2}$ s$^{-1}$ thermal flux in the rabbit tube and 4E6 cm$^{-2}$s$^{-1}$ in the thermal beam. Assume the tritium cross section of Li-6 of 940.9b, a lithium carbonate density of 2.11 g/cm, a lithium-6 enrichment of 95%, a lithium carbonate molar mass of 72.1383 amu adjusted for enrichment, Avogadro number of 6.02214E23.

$$In[1] * \rho = 2.11$$

$$Out[1] = 2.11$$

$$In[2] = area = 1.0$$

$$Out[2] = 1.$$

$$In[3] = thick = 10 *^\wedge -4$$

$$Out[3] = \frac{1}{1000}$$

$$In[4] = \phi = 2 *^\wedge 12$$

$$Out[4] = 2\,000\,000\,000\,000$$

$$In[5] = \sigma = 940.9 *^\wedge -24$$

$$Out[5] = 9.409 \times 10^{-22}$$

$$In[6] = mm = 72.1383$$

-continued $$Out[6] = 72.1383$$

$$In[7] = Na = 6.02214 *^\wedge 23$$

$$Out[7] = 6.02214 \times 10^{23}$$

Atomic density in cm$^{-3}$, rates integrated over volume and will be in s$^{-1}$.

Calculate the triton production rate and total number of tritons. NLi, NTritRate, and NTrit are values for 95% enriched Li-6 targets.

$$In[8] = NLi = \rho / mm * Na * 2 * 0.95$$

$$Out[8] = 3.34673 \times 10^{22}$$

$$In[9] = NTritRate = NLi * \phi * \sigma * area * thick$$

$$Out[9] = 6.29788 \times 10^{10}$$

Assume 1 second of operation in the rabbit tube.

$$In[10] = NTrit = NTritRate * 1$$

$$Out[10] = 6.29788 \times 10^{10}$$

Calculations for natural Li-6, variable names have been made more clear.

$$In[11] = NatLi = \rho / mm * Na * 2 * 0.0485$$

$$Out[11] = 1.7086 \times 10^{21}$$

$$In[12] = NatTritRate = NatLi * \phi * \sigma * thick * area$$

$$Out[12] = 3.21523 \times 10^9$$

Assume is irradiation in the rabbit tube.

$$In[13] = NatTrit = NatTritRate * 1.$$

$$Out[13] = 3.21523 \times 10^9$$

Now, perform a calculation for triton produced in the thermal beam for 10 minutes. This set is for 95% enriched $Li_2CO_3$.

$$In[14] = fluxbeam = 4 *^\wedge 6$$

$$Out[14] = 4\,000\,000$$

$$[In]15 = NLiBeam95 = \rho / mm * Na * 2 * 0.95$$

$$Out[15] = 3.34673 \times 10^{22}$$

$$In[16] = ThermalBeam95Rate = NLiBeam95 * fluxbeam * \sigma * area * thick$$

$$Out[16] = 125\,958,$$

$$In[17] = ThermaBeam10Min95 = ThermalBeam95Rate * 60 * 10$$

$$Out[17] = 7.55746 \times 10^7$$

$$In[18] = ThermalBeam20Min95 = 2 * ThermaBeam10Min95$$

$$Out[18] = 1.51149 \times 10^8$$

$$In[19] = ThermalBeam30Min95 = 3 * ThermaBeam10Min95$$

$$Out[19] = 2.26724 \times 10^8$$

$$In[20] = ThermalBeam60Min95 = 6 * ThermaBeam10Min95$$

-continued $$Out[20] = 4.53447 \times 10^8$$

Perform thermal beam calculations for natural abundance Li-6 $Li_2CO_3$.

$$In[21] = NLiBeamNat * \rho / mm * Na * 2 * 0.0485$$

$$Out[21] = 1.7086 \times 10^{21}$$

$$In[22] = ThermalBeamNatRate = NLiBeamNat * fluxbeam * \sigma * area * thick$$

$$Out[22] = 6430.47$$

$$In[23] = ThermaBeam10MinNat = ThermalBeamNatRate * 60 * 10$$

$$Out[23] = 3.85828 \times 10^6$$

$$In[24] = ThermalBeam20MinNat = 2 * ThermaBeam10MinNat$$

$$Out[24] = 7.71656 \times 10^6$$

$$In[25] = ThermalBeam30MinNat = 3 * ThermaBeam10MinNat$$

$$Out[25] = 1.15748 \times 10^7$$

$$In[26] = ThermalBeam60MinNat = 6 * ThermaBeam10MinNat$$

$$Out[26] = 2.31497 \times 10^7$$

Activity calculations for each experiment. Calculate the activity of each sample in pCi, $$In[30] = \lambda \frac{Log[2]}{12.32 * 365.2425 * 24 * 3600}$$

$$Out[30] = 1.78287 \times 10^{-9}$$

Rabbit tube activities for 95% enriched Li-6 target (pCi).

$$In[31] = RabbitActivity95OneSec = NTrit * \lambda * \frac{1}{0.037}$$

$$Out[31] = 3034.68$$

$$In[32] = RabbitActivity95TenSec = 10 * RabbitActivity95OneSec$$

$$Out[32] = 30\,346.8$$

Rabbit tube activities for natural abundance Li-6 target (pCi).

$$In[33] = RabbitActivityNatOneSec = NatTrit * \lambda * \frac{1}{0.037}$$

$$Out[33] = 154.928$$

$$In[34] = RabbitActivityNatTenSec = RabbitActivityNatOneSec * 10$$

$$Out[34] = 1549.28$$

Activities for 95% enriched samples in the thermal beam (pCi):

$$In[35] = ThermalActivity95TenMin = ThermaBeam10Min95 * \lambda * \frac{1}{0.037}$$

-continued $$Out[35] = 3.64161$$

$$In[36] = ThermalActivity95TwentyMin = ThermalBeam20Min95 * \lambda * \frac{1}{0.037}$$

$$Out[36] = 7.28322$$

$$In[37] = ThermalActivity95ThirtyMin = ThermalBeam30Min95 * \lambda * \frac{1}{0.037}$$

$$Out[37] = 10.9248$$

$$In[38] = ThermalActivity95SixtyMin = ThermalBeam60Min95 * \lambda * \frac{1}{0.037}$$

$$Out[38] = 21.6497$$

Activities for natural abundance Li-6 samples in the thermal beam (pCi):

$$In[39] = ThermalActivityNatTenMin = ThermaBeam10MinNat * \lambda * \frac{1}{0.037}$$

$$Out[39] = 0.185914$$

$$In[40] = ThermalActivityNatTwentyMin = ThermalBeam20MinNat * \lambda * \frac{1}{0.037}$$

$$Out[40] = 0.371828$$

$$In[41] = ThermalActivityNatThirtyMin = ThermalBeam30MinNat * \lambda * \frac{1}{0.037}$$

$$Out[41] = 0.557742$$

$$In[42] = ThermalActivityNatSixtyMin = ThermalBeam60MinNat * \lambda * \frac{1}{0.037}$$

$$Out[42] = 1.11548$$

Worst Case Scenario Calculations (7 hours at full power). Note the order of isotope concentration in this section.

Worst Case scenarios: rabbit tube 7 hour irradiation (µCi):

$$In[45] = RabbitWorstCases95 = NTritRate * 3600 * 7 * \lambda * \frac{1}{37000_*}$$

$$Out[45] = 76.4739$$

$$In[46] = RabbitWorstCaseNat = NatTritRate * 3600 * 7 * \frac{1}{37000_*}$$

$$Out[46] = 3.90419$$

Worst Case scenario: thermal beam 7 hour irradiation (nCi):

$$In[47] = ThermalBeamWorstCase95 = ThermalBeam60Min95 * 7 * \lambda * \frac{1}{37_*}$$

$$Out[47] = 0.152948$$

$$In[48] = ThermalBeamWorstCaseNat = ThermalBeam60MinNat * 7 * \lambda * \frac{1}{37}$$

$$Out[48] = 0.00700838$$

Example 5

The samples being analyzed are lithium carbonate with variable Li-6 enrichment; CR-39 will be used to track triton generated from the thermal neutron reactions. CR-39 sheets with a thickness of 0.5 mm will be thick enough to stop these particle. CR-39 sheets can be cut into ~1.3 cm×1.3 cm squares to sandwich the lithium carbonate sample.

Each particle or Lithium carbonate will create a "fried-egg" pattern on the CR-39. Easily identified.

The CR-39 sheets can be 50.8 mm×$10^8$ mm and about 1 mm thick, which can then be cut or otherwise divided into appropriately sized pieces for the experiments. Five of these sheets can yield up to 60 potential samples (12 sandwiches per sheet) if they are cut into 1.3 cm×1.3 cm pieces.

Example 6

CR-39
 Film, plastic
 α-particles make tracks
 AI image processing
 Also known as PADC
 Efficiency with lithium activation?
Li-6 Producing Reactions?
 NDP
 Neutron track
$Li_2CO_3$
 Change facility focus to glovebox
 In-core, not flux form beam
  Reaction rate per $cm^2$ $$5 \times 10^{12} \text{ thermal}$$
$$1.2 \times 10^{13} \text{ total}$$

Central radiation facility
No steady state
CR-39 reaction rate?
Quantify Li-6
Determine rate of tritium production
CR-39 as a method to verify tritium reaction rate with different reactor power level
 No molten salt
RTE
 CR-39 and $Li_2X$, irradiate it, measure tracks, determine molten salt Li content
 100% efficient detection of tritium
 Minimum thickness of salt to measure 100% tritium
 Quick image processing for RTE
 Detection limits of other methods
Next Steps:
 Order CR-39 sheets
  Quote request planned
 Deposit thin salt layer?
 Glue?
 Detection limit per neutron
 CR-39 detecting trace amounts of Li-6
 $^3H$ yield, upper limit
 Thicker CR-39, focusing past other tracks
 Thermal flux at beam—$10^6$
 CR-39 chemical etching
 $Li_2CO_3$ in W46
Tritium Rate Measurement
CR-39 Molar Mass/Composition
 CR-39 monomer: Allyl diglycol carbonate ($C_{12}H_{18}O_7$).
Molar Mass:
 274.27 g/mole (chembk)
 274.25 g/mol per calculation below

| Atom | Mole % |
|---|---|
| C | 52.550 |
| H | 6.614 (Truncated instead) |
| O | 40.836 |

Lithium Carbonate
Molar Mass:
 73.889 g/mol

| Atom | Mole % |
|---|---|
| Li | 18.788% |
| C | 16.254% |
| O | 64.958% |

SRIM/TRIM Results:
 2.75 MeV Triton in:

| | | |
|---|---|---|
| CR-39 | 116 μm | } ranges |
| $Li_2CO_3$ | 73.2 μm | |

1 mm CR-39 is sufficient, 5 mm is strong enough to handle cutting.

$Li_2CO_3$ solubility in water at 20° C. is 8.4-13 g/L. Previous calculations assumed a 10 μm $Li_2CO_3$ layer, 2.11 $g/cm^3$.

Volume of 0.001 $cm^3$, mass of 0.00211 g for a 10 μm layer, using 1 mL solvent.

Getting 5 sheets of CR-39.

Sheets are 50.8 mm × 108 mm × 1.0 mm

Target "sandwich" size:1.3 cm × 1.3 cm.

Sandwiches are made of two "plates."

$$(5.08 \text{ cm}/1.3 \text{ cm per plate}) = 3.907 \text{ plates} \rightarrow 3 \text{ plates along width}$$
$$(10.8 \text{ cm}/1.3 \text{ cm per plate}) = 8.3 \text{ plates} \rightarrow 8 \text{ plates along length}$$

Sandwiches in a sheet:

$$[(8 \times 3)/2)] = 12 \text{ sandwiches}$$

5 sheets→60 sandwiches; 30 for nat. $Li_2CO_3$ and 30 for enriched $Li_2CO_3$ $$DI \text{ water} - Li_2CO_3 \text{ potential solubility of } 8.4 - 13 \text{ g/L.}$$

For a 10 μm layer using 1 mL water, 0.00211 g $Li_2CO_3$ is needed.

Try for 0.211 g in 100 mL solvent.

$$\text{Massed } Li_2CO_3 - 0.2108 \text{ g.}$$

Exceedingly difficult to dissolve at room temperature.

Gentle agitation for 20 minutes dissolves sample in DI water at room temperature.

What's the flux for an Am—Be source using non-borated high-density polyethylene plastic (HDPE) (poly) as a moderator?

Use hydrogen in poly, Am—Be is a 500 mCi point-source.

CR-39 target is 2 cm from the poly block in air (arbitrary distance).

Figure 3:
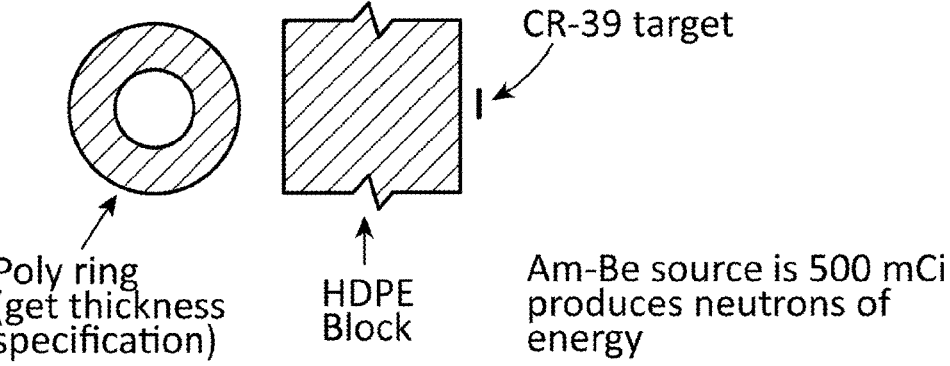
FIG. 3. Schematic diagram illustrating set up.

Point source at origin, as shown in FIG. 3.

EXEMPLARY ASPECTS

In view of the described compositions, devices, systems, and methods, herein below are described certain more particularly described aspects of the inventions. The particularly recited aspects should not, however, be interpreted to have any limiting effect on any different claims containing different or more general teachings described herein or that the "particular" aspects are somehow limited in some way other than the inherent meanings of the language and formulas literally used therein.

Example 1: A device for measuring tritium production, the device comprising: a first layer comprising a first detection material; and a second layer comprising a second detection material; wherein the first detection material and the second detection material are the same or different; the first layer having a first thickness and the second layer having a second thickness, wherein the first thickness and the second thickness are the same or different; wherein the first thickness and the second thickness are configured such that tritium cannot pass through the first layer or the second layer; when the device is assembled together with: a composition comprising lithium (e.g., a lithium composition); and a neutron irradiation source; such that the lithium composition is in contact with and sandwiched between the first layer and the second layer, the first layer and the second layer each having a perimeter which together form a periphery of the device, and the first layer is sealed to the second layer to form a seal (e.g., around the periphery) such that the lithium composition is substantially contained within a chamber formed by the first layer, the second layer, and the seal; and such that the neutron irradiation source is configured to irradiate the lithium composition disposed within the chamber formed by the first layer, the second layer, and the seal; then the device produces tritium within the chamber that diffuses to the first layer and/or the second layer, and the tritium interacts with the first detection material and/or the second detection material to thereby form a signal that is detected and analyzed to determine a property of tritium, such as the presence or absence of tritium production, the amount or concentration of tritium produced, the rate of tritium production, or a combination thereof.

Example 2: The device of any examples herein, particularly example 1, wherein the device further comprises the lithium composition.

Example 3: The device of any examples herein, particularly example 1 or example 2, wherein the lithium composition comprises a third layer sandwiched between the first layer and the second layer, the third layer having a third thickness configured to allow tritium to escape the lithium composition and enter the first layer and/or second layer.

Example 4: The device of any examples herein, particularly example 3, wherein the third thickness is from 1 to 100 micrometers, such as from 1 to 25 micrometers, or from 5 to 10 micrometers.

Example 5: The device of any examples herein, particularly examples 1-4, wherein the lithium composition comprises lithium metal.

Example 6: The device of any examples herein, particularly examples 1-5, wherein the lithium composition comprises a lithium compound, such as $Li_2CO_3$ and/or FLiBe.

Example 7: The device of any examples herein, particularly examples 1-6, wherein the lithium composition comprises a powder, a rod, a film, a molten salt, or a combination thereof.

Example 8: The device of any examples herein, particularly examples 1-7, wherein the lithium composition comprises natural lithium or enriched lithium (e.g., enriched with Li-6).

Example 9: The device of any examples herein, particularly examples 1-8, wherein the lithium composition is enriched with Li-6.

Example 10: The device of any examples herein, particularly examples 1-9, wherein the lithium composition is 90% to 100% enriched with Li-6 (e.g., 95% enriched).

Example 11: The device of any examples herein, particularly examples 1-10, wherein the chamber has any suitable shape and/or dimensions.

Example 12: The device of any examples herein, particularly examples 1-11, wherein the first thickness is selected in view of the first detection material and the second thickness is selected in view of the second detection material, such that the device has sufficient rigidity and to selectively capture tritium within the first layer and/or the second layer.

Example 13: The device of any examples herein, particularly examples 1-12, wherein the first detection material and/or the second detection material independently comprises a polymer, such as CR-39, cellulose, or a combination thereof.

Example 14: The device of any examples herein, particularly examples 1-13, wherein the first detection material and the second detection material are the same.

Example 15: The device of any examples herein, particularly examples 1-14, wherein the first detection material and the second detection material both comprise CR-39.

Example 16: The device of any examples herein, particularly examples 1-15, wherein the first thickness and/or the second thickness are each independently from 0.1 to 10 millimeters, such as from 1 to 5 millimeters or from 0.25 to 1.5 millimeters.

Example 17: The device of any examples herein, particularly examples 1-16, wherein the first layer and/or the second layer independently has a lateral surface area of from 0.1 to 100 cm 2, such as from 0.1 to 10 $cm^2$ or from 0.5 to 5 $cm^2$.

Example 18: The device of any examples herein, particularly examples 1-17, wherein the first layer and the second layer are the same.

Example 19: The device of any examples herein, particularly examples 1-18, wherein the device further comprises: a fourth layer comprising a first alpha particle blocking material; and a fifth layer comprising a second alpha particle blocking material; wherein the first alpha particle blocking material and the second alpha particle blocking material are the same or different; the fourth layer having a fourth thickness and the fifth layer having a fifth thickness, wherein the fourth thickness and the fifth thickness are the same or different; wherein the fourth thickness and the fifth thickness are configured such that alpha particles cannot pass through the fourth layer or the fifth layer, but tritium can pass through both the fourth layer and the fifth layer; when the device is assembled together with: the lithium composition;

and the neutron irradiation source; such that: the lithium composition is in contact with and sandwiched between the fourth layer and the fifth layer; the fourth layer is in contact with and sandwiched between the first layer and the lithium composition; the fifth layer is in contact with and sandwiched between the second layer and the lithium composition; and the lithium composition, the fourth layer, and the fifth layer are contained within the chamber formed by the first layer, the second layer, and the seal; and then the device produces tritium within the chamber that diffuses through the fourth layer and/or the fifth layer to the first layer and/or the second layer, and when the device produces alpha particles within the chamber, then the alpha particles diffuse to and are captured by the fourth layer and/or the fifth layer.

Example 20: The device of any examples herein, particularly example 19, wherein the fourth thickness is selected in view of the first alpha particle blocking material and the fifth thickness is selected in view of the second alpha particle blocking material, such that the device selectively captures alpha particles within the fourth layer and/or the fifth layer.

Example 21: The device of any examples herein, particularly example 19 or example 20, wherein the first alpha particle blocking material and/or the second alpha particle blocking material comprises a polymer, such as Kapton, Mylar, or a combination thereof.

Example 22: The device of any examples herein, particularly examples 19-21, wherein the first alpha particle blocking material and the second alpha particle blocking material are the same.

Example 23: The device of any examples herein, particularly examples 19-22, wherein the first alpha particle blocking material and the second alpha particle blocking material both comprise Kapton.

Example 24: The device of any examples herein, particularly examples 19-23, wherein the fourth layer and the fifth layer are the same.

Example 25: The device of any examples herein, particularly examples 1-24, wherein the device further comprises the neutron irradiation source configured to irradiate the lithium composition.

Example 26: The device of any examples herein, particularly examples 1-25, wherein the neutron irradiation source comprises a nuclear reactor, a thermal neutron beam, a thermal neutron source such as a thermalized Am—Be source, or a combination thereof.

Example 27: The device of any examples herein, particularly examples 1-26, wherein the neutron irradiation source has a neutron flux, such as from $1 \times 10^6$ to $5 \times 10^{13}$ $cm^{-2}s^{-1}$, or from $5 \times 10^6$ to $1.2 \times 10^{13}$ $cm^{-2}s^{-1}$.

Example 28: A method for measuring tritium production, the method comprising: disposing a composition comprising lithium (e.g., a lithium composition) between a first layer comprising a first detection material and a second layer comprising a second detection material, the first layer and the second layer each having a perimeter which together form a periphery; sealing (e.g., hermetically sealing) the first layer to the second layer (e.g., around the periphery) such that the lithium composition is substantially contained within a chamber formed by the first layer, the second layer, and the seal (e.g., hermetic seal) between the first layer and the second layer; wherein the first detection material and the second detection material are the same or different; the first layer having a first thickness and the second layer having a second thickness, wherein the first thickness and the second thickness are the same or different; wherein the first thickness and the second thickness are configured such that tritium cannot pass through the first layer or the second layer; irradiating the lithium composition within the chamber with a neutron irradiation source; thereby producing tritium gas within the chamber that diffuses to the first layer and/or the second layer, and the tritium interacts with the first detection material and/or the second detection material to thereby form a signal; detecting and analyzing the signal to determine a property of tritium, such as the presence or absence of tritium production, the amount or concentration of tritium produced, the rate of tritium production, or a combination thereof.

Example 29: A method for measuring tritium production, the method comprising: disposing a composition comprising lithium (e.g., a lithium composition) between a fourth layer comprising a first alpha particle blocking material and a fifth layer comprising a second alpha particle blocking material, thereby forming a first stack; and disposing the first stack between a first layer comprising a first detection material and a second layer comprising a second detection material; such that the lithium composition is in contact with and sandwiched between the fourth layer and the fifth layer, the fourth layer is in contact with and sandwiched between the first layer and the lithium composition, and the fifth layer is in contact with and sandwiched between the second layer and the lithium composition; the first layer and the second layer each having a perimeter which together form a periphery; sealing (e.g., hermetically sealing) the first layer to the second layer (e.g., around the periphery) such that the lithium composition, the fourth layer, and the fifth layer are substantially contained within a chamber formed by the first layer, the second layer, and the seal (e.g., hermetic seal) between the first layer and the second layer; wherein the first detection material and the second detection material are the same or different; the first layer having a first thickness and the second layer having a second thickness, wherein the first thickness and the second thickness are the same or different; wherein the first thickness and the second thickness are configured such that tritium cannot pass through the first layer or the second layer; wherein the first alpha particle blocking material and the second alpha particle blocking material are the same or different; the fourth layer having a fourth thickness and the fifth layer having a fifth thickness, wherein the fourth thickness and the fifth thickness are the same or different; wherein the fourth thickness and the fifth thickness are configured such that alpha particles cannot pass through the fourth layer or the fifth layer, but tritium can pass through both the fourth layer and the fifth layer; irradiating the lithium composition within the chamber with a neutron irradiation source; thereby producing tritium gas within the chamber that diffuses through the fourth layer and/or the fifth layer to the first layer and/or the second layer, and the tritium interacts with the first detection material and/or the second detection material to thereby form a signal; when alpha particles are produced within the chamber, then the alpha particles diffuse to and are captured by the fourth layer and/or the fifth layer; detecting and analyzing the signal to determine a property of tritium, such as the presence or absence of tritium production, the amount or concentration of tritium produced, the rate of tritium production, or a combination thereof.

Example 30: The method of any examples herein, particularly example 28 or example 29, wherein the neutron irradiation source comprises a nuclear reactor, a thermal neutron beam, a thermal neutron source such as a thermalized Am—Be source, or a combination thereof.

Example 31: The method of any examples herein, particularly examples 28-30, wherein the neutron irradiation source has a neutron flux, such as from $1\times10^6$ to $5\times10^{13}$ $cm^{-2}s^{-1}$, or from $5\times10^6$ to $1.2\times10^{13}$ $cm^{-2}s^{-1}$.

Example 32: The method of any examples herein, particularly examples 28-31, wherein the lithium composition is irradiated within the chamber by the neutron irradiation source for an amount of time of from one second to 1 hour.

Example 33: The method of any examples herein, particularly examples 28-32, wherein the method further comprises separating the first layer and the second layer after irradiation and before detection.

Example 34: The method of any examples herein, particularly example 33, wherein the method further comprises cleaning the first layer and the second layer after separation and before detection.

Example 35: The method of any examples herein, particularly examples 28-34, wherein detecting the signal comprises microscopic imaging and analyzing the signal comprises image analysis, such as manual or automated image analysis (e.g., AI assisted image analysis).

Example 36: The method of any examples herein, particularly examples 28-35, wherein the detection comprises a $4\pi$ solid angle of detection.

Example 37: The method of any examples herein, particularly examples 28-36, further comprising, after detection and analysis, re-using the first layer and the second layer with a new lithium composition (e.g., repeating the method of any examples herein, particularly examples 21-44).

Example 38: The method of any examples herein, particularly examples 28-37, wherein the lithium composition comprises a third layer sandwiched between the first layer and the second layer, the third layer having a third thickness configured to allow tritium to escape the lithium composition and enter the first layer.

Example 39: The method of any examples herein, particularly example 38, wherein the third thickness is from 1 to 100 micrometers, such as from 1 to 25 micrometers, or from 5 to 10 micrometers.

Example 40: The method of any examples herein, particularly examples 28-39, wherein the lithium composition comprises lithium metal.

Example 41: The method of any examples herein, particularly examples 28-40, wherein the lithium composition comprises a lithium compound, such as $Li_2CO_3$ and/or FLiBe.

Example 42: The method of any examples herein, particularly examples 28-41, wherein the lithium composition comprises a powder, a rod, a film, a molten salt, or a combination thereof.

Example 43: The method of any examples herein, particularly examples 28-42, wherein the lithium composition comprises natural lithium or enriched lithium (e.g., enriched with Li-6).

Example 44: The method of any examples herein, particularly examples 28-43, wherein the lithium composition is enriched with Li-6.

Example 45: The method of any examples herein, particularly examples 28-44, wherein the lithium composition is 90% to 100% enriched with Li-6 (e.g., 95% enriched).

Example 46: The method of any examples herein, particularly examples 28-45, wherein the chamber has any suitable shape and/or dimensions.

Example 47: The method of any examples herein, particularly examples 28-46, wherein the first thickness is selected in view of the first detection material and the second thickness is selected in view of the second detection material, such that first layer and/or the second layer has sufficient rigidity and selectively capture tritium within the first layer and/or the second layer.

Example 48: The method of any examples herein, particularly examples 28-47, wherein the first detection material and/or the second detection material independently comprises a polymer, such as CR-39, cellulose, or a combination thereof.

Example 49: The method of any examples herein, particularly examples 28-48, wherein the first detection material and the second detection material are the same.

Example 50: The method of any examples herein, particularly examples 28-49, wherein the first detection material and the second detection material both comprise CR-39.

Example 51: The method of any examples herein, particularly examples 28-50, wherein the first thickness and/or the second thickness are each independently from 0.1 to 10 millimeters, such as from 1 to 5 millimeters or from 0.25 to 1.5 millimeters.

Example 52: The method of any examples herein, particularly examples 28-51, wherein the first layer and/or the second layer independently has a lateral surface area of from 0.1 to 100 cm 2, such as from 0.1 to 10 $cm^2$ or from 0.5 to 5 $cm^2$.

Example 53: The method of any examples herein, particularly examples 28-52, wherein the first layer and the second layer are the same.

Example 54: The method of any examples herein, particularly examples 29-53, wherein the fourth thickness is selected in view of the first alpha particle blocking material and the fifth thickness is selected in view of the second alpha particle blocking material, such that the fourth layer and/or the fifth layer can selectively capture alpha particles.

Example 55: The method of any examples herein, particularly examples 29-54, wherein the first alpha particle blocking material and/or the second alpha particle blocking material comprises a polymer, such as Kapton, Mylar, or a combination thereof.

Example 56: The method of any examples herein, particularly examples 29-55, wherein the first alpha particle blocking material and the second alpha particle blocking material are the same.

Example 57: The method of any examples herein, particularly examples 29-56, wherein the first alpha particle blocking material and the second alpha particle blocking material both comprise Kapton.

Example 58: The method of any examples herein, particularly examples 29-57, wherein the fourth layer and the fifth layer are the same.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The devices and methods of the appended claims are not limited in scope by the specific devices and methods described herein, which are intended as illustrations of a few aspects of the claims and any devices and methods that are functionally equivalent are intended to fall within the scope of the claims. Various modifications of the devices and methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A device for measuring tritium production, the device comprising:
   a first layer comprising a first detection material; and
   a second layer comprising a second detection material;
   wherein the first detection material and the second detection material are the same or different;
   the first layer having a first thickness and the second layer having a second thickness, wherein the first thickness and the second thickness are the same or different;
   wherein the first thickness and the second thickness are configured such that tritium cannot pass through the first layer or the second layer;
   when the device is assembled together with:
      a lithium composition, the lithium composition being a composition comprising lithium; and
      a neutron irradiation source;
      such that the lithium composition is in contact with and sandwiched between the first layer and the second layer, the first layer and the second layer each having a perimeter which together form a periphery of the device, and the first layer is sealed to the second layer to form a seal around the periphery such that the lithium composition is substantially contained within a chamber formed by the first layer, the second layer, and the seal; and
      such that the neutron irradiation source is configured to irradiate the lithium composition disposed within the chamber formed by the first layer, the second layer, and the seal;
   then the device produces tritium within the chamber that diffuses to the first layer and/or the second layer, and the tritium interacts with the first detection material and/or the second detection material to thereby form a signal that is detected and analyzed to determine a property of tritium.

2. The device of claim 1, wherein the device further comprises the lithium composition.

3. The device of claim 1, wherein the lithium composition comprises a third layer sandwiched between the first layer and the second layer, the third layer having a third thickness, wherein the third thickness is from 1 to 100 micrometers.

4. The device of claim 1, wherein the lithium composition comprises lithium metal.

5. The device of claim 1, wherein the lithium composition comprises a lithium compound.

6. The device of claim 1, wherein the lithium composition comprises natural lithium or lithium enriched with Li-6.

7. The device of claim 1, wherein the first detection material and/or the second detection material independently comprise CR-39, cellulose, or a combination thereof.

8. The device of claim 1, wherein the first detection material and the second detection material are the same.

9. The device of claim 1, wherein the first detection material and the second detection material both comprise CR-39.

10. The device of claim 1, wherein the first thickness and/or the second thickness are each independently from 0.1 to 10 millimeters.

11. The device of claim 1, wherein the first layer and/or the second layer independently has a lateral surface area of from 0.1 to 100 $cm^2$.

12. The device of claim 1, wherein the first layer and the second layer are the same.

13. The device of claim 1, wherein the property of tritium is the presence or absence of tritium production, the amount or concentration of tritium produced, the rate of tritium production, or a combination thereof.

14. The device of claim 1, wherein the device further comprises:
   a fourth layer comprising a first alpha particle blocking material; and
   a fifth layer comprising a second alpha particle blocking material;
   wherein the first alpha particle blocking material and the second alpha particle blocking material are the same or different;
   the fourth layer having a fourth thickness and the fifth layer having a fifth thickness, wherein the fourth thickness and the fifth thickness are the same or different;
   wherein the fourth thickness and the fifth thickness are configured such that alpha particles cannot pass through the fourth layer or the fifth layer, but tritium can pass through both the fourth layer and the fifth layer;
   when the device is assembled together with:
      the lithium composition; and
      the neutron irradiation source;
      such that:
         the lithium composition is in contact with and sandwiched between the fourth layer and the fifth layer;
         the fourth layer is in contact with and sandwiched between the first layer and the lithium composition;
         the fifth layer is in contact with and sandwiched between the second layer and the lithium composition; and
         the lithium composition, the fourth layer, and the fifth layer are contained within the chamber formed by the first layer, the second layer, and the seal; and
      then the device produces tritium within the chamber that diffuses through the fourth layer and/or the fifth layer to the first layer and/or the second layer, and
      when the device produces alpha particles within the chamber, then the alpha particles diffuse to and are captured by the fourth layer and/or the fifth layer.

15. The device of claim 14, wherein the first alpha particle blocking material and/or the second alpha particle blocking material comprises Kapton, Mylar, or a combination thereof.

16. The device of claim 14, wherein the first alpha particle blocking material and the second alpha particle blocking material are the same.

17. The device of claim 14, wherein the first alpha particle blocking material and the second alpha particle blocking material both comprise Kapton.

18. The device of claim 14, wherein the fourth layer and the fifth layer are the same.

19. A method for measuring tritium production, the method comprising:
   disposing a lithium composition, the lithium composition being a composition comprising lithium, between a first layer comprising a first detection material and a second layer comprising a second detection material, the first layer and the second layer each having a perimeter which together form a periphery;

sealing the first layer to the second layer around the periphery such that the lithium composition is substantially contained within a chamber formed by the first layer, the second layer, and the seal between the first layer and the second layer;

wherein the first detection material and the second detection material are the same or different;

the first layer having a first thickness and the second layer having a second thickness, wherein the first thickness and the second thickness are the same or different;

wherein the first thickness and the second thickness are configured such that tritium cannot pass through the first layer or the second layer;

irradiating the lithium composition within the chamber with a neutron irradiation source;

thereby producing tritium gas within the chamber that diffuses to the first layer and/or the second layer, and the tritium interacts with the first detection material and/or the second detection material to thereby form a signal;

detecting and analyzing the signal to determine a property of tritium.

20. A method for measuring tritium production, the method comprising:

disposing a lithium composition, the lithium composition being a composition comprising lithium, between a fourth layer comprising a first alpha particle blocking material and a fifth layer comprising a second alpha particle blocking material, thereby forming a first stack; and disposing the first stack between a first layer comprising a first detection material and a second layer comprising a second detection material;

such that the lithium composition is in contact with and sandwiched between the fourth layer and the fifth layer, the fourth layer is in contact with and sandwiched between the first layer and the lithium composition, and the fifth layer is in contact with and sandwiched between the second layer and the lithium composition;

the first layer and the second layer each having a perimeter which together form a periphery;

sealing the first layer to the second layer around the periphery such that the lithium composition, the fourth layer, and the fifth layer are substantially contained within a chamber formed by the first layer, the second layer, and the seal between the first layer and the second layer;

wherein the first detection material and the second detection material are the same or different;

the first layer having a first thickness and the second layer having a second thickness, wherein the first thickness and the second thickness are the same or different;

wherein the first thickness and the second thickness are configured such that tritium cannot pass through the first layer or the second layer;

wherein the first alpha particle blocking material and the second alpha particle blocking material are the same or different;

the fourth layer having a fourth thickness and the fifth layer having a fifth thickness, wherein the fourth thickness and the fifth thickness are the same or different;

wherein the fourth thickness and the fifth thickness are configured such that alpha particles cannot pass through the fourth layer or the fifth layer, but tritium can pass through both the fourth layer and the fifth layer;

irradiating the lithium composition within the chamber with a neutron irradiation source;

thereby producing tritium gas within the chamber that diffuses through the fourth layer and/or the fifth layer to the first layer and/or the second layer, and the tritium interacts with the first detection material and/or the second detection material to thereby form a signal;

when alpha particles are produced within the chamber, then the alpha particles diffuse to and are captured by the fourth layer and/or the fifth layer;

detecting and analyzing the signal to determine a property of tritium.

* * * * *